United States Patent [19]
Kiriki

[11] Patent Number: 5,541,775
[45] Date of Patent: Jul. 30, 1996

[54] OPTICAL SYSTEM INCLUDING A DISTRIBUTED INDEX OPTICAL ELEMENT IN COMBINATION WITH A LENS HAVING A HOMOGENEOUS REFRACTIVE INDEX

[75] Inventor: Toshihiko Kiriki, Tokyo, Japan

[73] Assignee: Konica Corporation, Japan

[21] Appl. No.: 212,761

[22] Filed: Mar. 11, 1994

[30] Foreign Application Priority Data

Mar. 30, 1993 [JP] Japan ................................. 5-093864
Aug. 2, 1993 [JP] Japan ................................. 5-208135

[51] Int. Cl.⁶ ................................................ G02B 15/14
[52] U.S. Cl. .......................................... 359/654; 359/687
[58] Field of Search ................................. 359/654, 687; 350/413, 428, 426, 427

[56] References Cited

U.S. PATENT DOCUMENTS

| 5,128,805 | 7/1992 | Kobayashi | 359/654 |
| 5,182,672 | 1/1993 | Mukai et al. | 359/654 |

FOREIGN PATENT DOCUMENTS

| 91316 | 5/1985 | Japan | G02B 9/02 |
| 221716 | 11/1985 | Japan | G02B 9/04 |
| 254923 | 11/1986 | Japan | G02B 27/30 |
| 911 | 1/1987 | Japan | G02B 15/163 |
| 124011 | 5/1988 | Japan | G02B 9/02 |
| 38711 | 2/1989 | Japan | G02B 15/16 |
| 79013 | 3/1990 | Japan | G02B 15/16 |
| 85819 | 3/1990 | Japan | G02B 15/20 |
| 15610 | 1/1992 | Japan | G02B 9/00 |
| 42109 | 2/1992 | Japan | G02B 9/00 |

*Primary Examiner*—David C. Nelms
*Assistant Examiner*—Vu A. Le
*Attorney, Agent, or Firm*—Bierman and Muserlian

[57] ABSTRACT

An optical system includes a refractive index distribution type optical element which configuration is formed to be a parallel plane plate. The refractive index distribution is provided in the radial direction perpendicular to an optical axis of the optical system, in which the refractive index is increased and a color dispersion value vd is decreased as a location on the optical element is farther away from the optical axis. The optical element is combined with a lens or a plurality of lenses, the refractive index of which is homogeneous, so that a chromatic aberration generated by the homogeneous refractive index lens can be compensated. When the refractive index distribution in the radial direction perpendicular to the optical axis is expressed by the following expression, $$n = n_0 i + n_1 i h^2 + n_2 h^4$$

where h is the height from the optical axis and i is the wave length respectively illustrated by lines d, F and C, then the following expression is satisfied, $$vdG = n_1 d/(n_1 F - n_1 c) < 20.$$

19 Claims, 32 Drawing Sheets

MERIDIONAL COMATIC ABERRATION

MERIDIONAL COMATIC ABERRATION

OPTICAL SYSTEM INCLUDING A DISTRIBUTED INDEX OPTICAL ELEMENT IN COMBINATION WITH A LENS HAVING A HOMOGENEOUS REFRACTIVE INDEX

BACKGROUND OF THE INVENTION

The present invention relates to a lens system including a lens element, the configuration of which is of a parallel plane plate, having a distribution of refractive index which is distributed in a radial direction perpendicular to the optical axis. More particularly, the present invention relates to a lens system in which chromatic aberration is compensated by the lens element.

Conventionally, what is called a radial GRIN lens is variously utilized. In this case, the radial GRIN lens is defined as a lens element having a refractive index distribution in a radial direction perpendicular to the optical axis.

Picture-taking lenses of simple construction for camera use having a refractive index distribution have been conventionally investigated. For example, the above picture-taking lenses are disclosed in the thesis by L. G. Atkinson ("Applied Optics" Vol. 21, No. 18, p 993–998) and the thesis by J. Brain Caldwell ("Applied Optics" Vol. 25, No. 18, p 3351–3355). Further, the technique is disclosed in Japanese Patent Publication Open to Public Inspection Nos. 42109/1992 and 221716/1985.

Examples in which the radial GRIN lens is used as a picture-taking lens of a camera or a video camera, especially examples in which the radial GRIN lens is used as a zoom lens, can be seen in patents which have already been applied. The examples are Japanese Patent Publication Open to Public Inspection Nos. 911/1987, 38711/1989, 15610/1992, 79013/1990, and 85819/1990. In any cases, the lens surface is not formed plane, but it is formed spherical or it is formed to be other curved surfaces.

On the other hand, what is called a radial GRIN lens in which a lens element having a refractive index distribution in a radial direction perpendicular to the optical axis, is applied to an optical laser beam system. The radial GRIN lens can be seen in Japanese Patent Publication Open to Public Inspection Nos. 254923/1986, 91316/1985 and 124011/1988.

The configuration of the surface of a picture-taking lens of the prior art having a refractive index distribution is formed as follows:

Both surfaces of the lens having a refractive index distribution are not plane. At least, one of the lens surfaces is spherical or aspherical. Therefore, with respect to the monochromatic aberration, the degree of freedom of the lens is high compared with a radial GRIN rod lens, both surfaces of which are plane. Accordingly, the performance of the conventional lens can be highly improved. However, from the viewpoint of practical use, the conventional lens is inferior, because it is difficult to machine the lens, and the costs are high.

In the conventional radial GRIN rod lens, both surface of which are formed plane in parallel, as it is applied to an optical laser beam system, consideration is given to the lens only when the refractive index distribution coefficient is a dominant wave length, and consideration is not given to the chromatic aberration of the optical system.

Technique of achromatism is disclosed in Japanese Patent Publication Open to Public Inspection No. 124011/1988. However, in this case, only radial GRIN rod lenses are combined in this lens system, so that the lens thickness is increased 3 to 4 times as much as the lens diameter. For this reason, it is difficult to put the lens into practical use.

SUMMARY OF THE INVENTION

The first object of the present invention is to compensate the chromatic aberration of a lens or a lens group of a picture-taking lens of a camera or a video camera when the lens system or the lens group includes at least one piece of homogeneous lens and a radial GRIN rod lens. In the case of a radial GRIN rod lens, as will be described later, it is relatively easy to obtain the physical properties in which the color dispersion value νd is approximately not more than 10. Therefore, in the color compensation of the lens system or the lens group, it is possible to reduce the power of the homogeneous lens. As a result, the entire optical system can be made compact, or the performance of the lens system can be improved under the condition that the dimensions are the same.

An embodiment of the present invention includes a refractive index distribution type optical element characterized in that: the configuration is formed to be a parallel plane plate; the refractive index distribution is provided in the radial direction perpendicular to the optical axis, in which the refractive index is increased and the color dispersion value νd is decreased as a location on the element is farther away from the optical axis; and the optical element is combined with a lens or a plurality of lenses, the refractive index of which is homogeneous, so that the chromatic aberration generated by the homogeneous refractive index lens can be compensated.

When the refractive index distribution in the radial direction perpendicular to the optical axis is expressed by the following expression, $$n = n_0 i + n_1 i h^2 + n_2 i h^4$$

where h is the height from the optical axis and i is the wave length respectively illustrated by lines d, F and C, then the following expression is satisfied.

$$\nu dG = n_1 d/(n_1 F - n_1 c) < 20$$

When the chromatic aberration compensation element is applied to a conventional optical system composed of the picture-taking lens of a single lens, a doublet or a zoom lens in which the chromatic aberration is conventionally difficult to be compensated, excellent effects can be provided.

In the case where a single lens or a doublet is used for the picture-taking lens, it is preferable that the lens described below is disposed on the same side as that of a lens of the homogeneous refractive index and an aperture stop. The above lens is described as follows: the configuration is a parallel plane plate; the refractive index is increased and the color dispersion value νd is decreased as a location on the lens is farther away from the optical axis; and the refractive index distribution is directed in the radial direction perpendicular to the optical axis. Especially, the lens is preferably disposed on the object side.

In the case of a zoom lens, it is preferable that at least one lens group among a plurality of lens groups includes: one or plural lenses of the homogeneous refractive index; and a lens element for compensating chromatic aberration caused in the aforementioned lens, and the configuration of the lens element is a parallel plane plate, having a refractive index distribution in the radial direction perpendicular to the optical axis. Especially, it is preferable that a lens group having a negative refraction includes: a lens element for compensating chromatic aberration caused by one or a plurality of lenses of the homogeneous refractive index, wherein the configuration of the lens element is a parallel plane plate, and the refractive index distribution of the lens element is directed in the radial direction perpendicular to the optical axis, and further the lens element has the function of a positive lens.

In the case where the lens system is composed of thin contact lenses, investigations are made as follows.

When the synthetic focal distance of a lens having a homogeneous refractive index is fH and the equivalent ν value of the synthetic system is vdH, and also when the focal distance of the radial GRIN rod lens is fG and the equivalent ν value is vdG, the conditions of achromatism is expressed as follows.

$$(1/fH \cdot vdH) + (1/fG \cdot vdG) = 0 \quad (1)$$

In this connection, when a plurality of lenses having a homogeneous refraction index are used, that is, when k pieces of lenses having a homogeneous refraction index are used, each focal distance fj (j=1 to k) and color dispersion value vdj (j=1 to k) can be expressed as follows.
[Expression]

$$\frac{1}{f_H} = \sum_{j=1}^{k} \frac{1}{f_j} \quad (2)$$

$$v_{dH} = \frac{\sum_{j=1}^{k} \frac{1}{f_j}}{\sum_{j=1}^{k} \frac{1}{f_j v_{dj}}} \quad (3)$$

where $$vdj = (n_{dj} - 1) / (n_{Fj} - n_{cj})$$

When the refractive index distribution of the radial GRIN rod lens is expressed by the following expression $$n = n_0 i + n_1 i h^2 \ldots \quad (4)$$

where H: height from the optical axis, and i: d, F and C line, the equivalent ν value vdG of the radial GRIN rod lens can be given by the following expression.

$$vdG = n_1 d/(n_1 F - n_1 c) \ldots \quad (5)$$

In this connection, in the case of optical material having a homogeneous refractive index such as glass and plastics, the actual color dispersion value vd satisfies the following inequalities.

In the case of nd=1.5, vd>50.
In the case of nd=1.7, vd>30.
In the case of nd>1.9, vd>20.

However, when consideration is given to the equivalent value ν of the radial GRIN rod lens, for example, in the case where nd=1.52206 and vd=43 on the optical axis, and also in the case where nd=1.56602 and vd=29 at the end of the effective diameter, the equivalent ν value vdG becomes as follows.

vdG=6

That is, material of extremely high color dispersion can be relatively easily obtained.

When the material of extremely high color dispersion is applied to the radial GRIN rod lens, the focal distance of the lens having a homogeneous refractive index can be extended from the achromatic condition described before.

For example, when the focal distance of a lens system is f and achromatism is carried out using a convex lens having a homogeneous refractive index in which the focal distance is $f_1$ and vd=50, and also using a concave lens in which the focal distance is $f_2$ and vd=25, the following expression is satisfied.

$$1/f = (1/f_1) + 9 \cdot 1/f_2)$$

Also, from the expression (1), the following relation is satisfied.

$$f_1/f_2 = 25/-50 = -\frac{1}{2}$$

Accordingly, the following results are obtained.

$$f_1 = 0.5 f, f_2 = -f$$

A convex lens of a homogeneous refractive index, the focal distance of which is $f_1$, and the value vd of which is vd =50, and a radial GRIN rod lens which functions as a concave lens, the focal distance of which is $f_2$, and the value vd of which is vd=10, are combined, in the same manner, the following expression is satisfied.

$$f_1/f_2 = -\frac{1}{5}$$

Accordingly, the following results are obtained.

$$f_1 = 0.8 f, f_2 = -4f$$

As explained above, the refraction of a lens having a homogeneous refractive index can be lowered. Therefore, not only the aberration can be reduced, but also the thickness of the center of a concave lens, or the thickness of the edge of a convex lens can be reduced. As a result, the overall lens length can be reduced. The refraction of a radial GRIN rod lens obtained by the refractive index distribution is limited. Therefore, when $f_2$ is increased, it is possible to suppress the increase of the thickness of the radial GRIN rod lens, which is very advantageous.

In the present invention, the right side of the expression (1) which shows the condition of achromatism, is not necessarily zero, and it is possible to permit an allowable range. The expression (1) can be deformed as follows.

$$-fG/fH = vdH/vdG$$

Here, an allowable range is permitted as follows.

$$-fG/fH = k \, (vdH/vdG) \quad (6)$$

where k is a constant. Consequently, chromatic aberration can be compensated in a range satisfying the following inequality.

$$0.4 < k < 2.5$$

That is, $$0.4(vdH/vdG) < -fG < 2.5(vdH/vdG) \quad (7)$$

Further, when the material satisfying the following inequality, achromatism can be carried out with positive and negative lenses having low power.

$$vdG < 20 \quad (8)$$

The foregoing is one of the characteristics of the radial GRIN rod lens.

Since the value of vdG can be reduced, the following inequality can be satisfied.

$$(vdH/vdG) > 4 \ldots \quad (9)$$

Due to the foregoing, achromatism can be carried out with positive and negative lenses having low power in the same manner.

"The parallel plane plate" described in this specification permits a small radius of curvature and a small error in parallelism that are caused in the process of machining.

BRIEF DESCRIPTION OF THE DRAWINGS

FIGS. 13(a), 13(b) and 13(c) are sectional views of the sixth embodiment of the zoom lens system of the present invention, wherein FIG. 13(a) shows a case of "wide angle", FIG. 13(b) shows a case of "intermediate", and FIG. 13(c) shows a case of "telephoto".

FIGS. 17(a), 17(b) and 17(c) are sectional views of the seventh embodiment of the zoom lens system of the present invention, wherein FIG. 17(a) shows a case of "wide angle", FIG. 17(b) shows a case of "intermediate", and FIG. 17(c) shows a case of "telephoto".

FIGS. 21(a), 21(b) and 21(c) are sectional views of the zoom lens system of the eighth embodiment of the present invention, wherein FIG. 21(a) shows a case of "wide angle", FIG. 21(b) shows a case of "intermediate", and FIG. 21(c) shows a case of "telephoto".

FIGS. 25(a), 25(b) and 25(c) are sectional views of the ninth embodiment of the zoom lens system of the present invention, wherein FIG. 25(a) shows a case of "wide angle", FIG. 25(b) shows a case of "intermediate", and FIG. 25(c) shows a case of "telephoto".

FIGS. 29(a), 29(b) and 29(c) are sectional views of the tenth embodiment of the zoom lens system of the present invention, wherein FIG. 29(a) shows a case of "wide angle", FIG. 29(b) shows a case of "intermediate", and FIG. 29(c) shows a case of "telephoto".

DETAILED DESCRIPTION OF THE PREFERRED EMBODIMENTS

Figure 1:
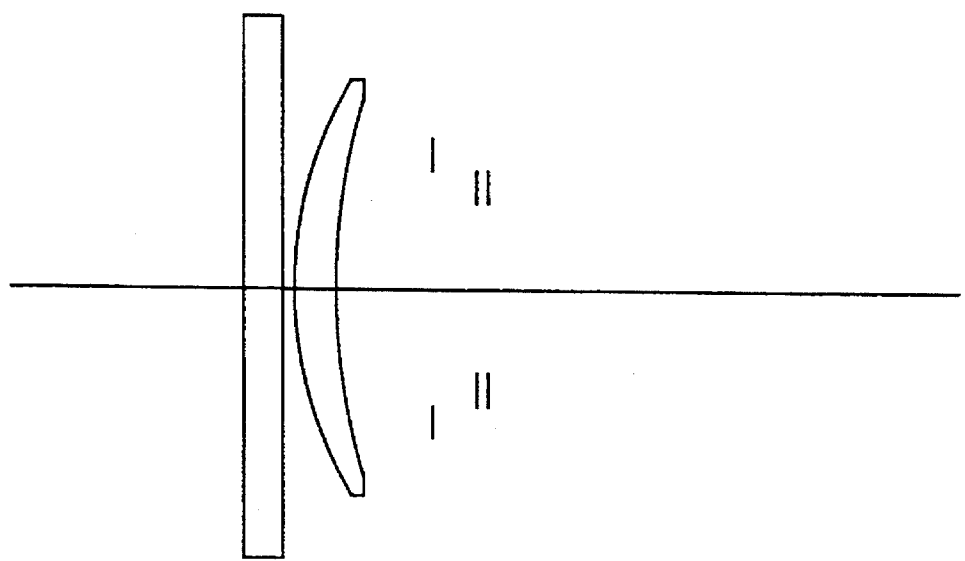
FIG. 1 is a sectional view showing the first embodiment of the picture-taking lens system of the present invention.

From the viewpoint of cost reduction, a single lens or a doublet, the F-number of which is large, is used for the picture-taking lens of a camera of relatively low price. Accordingly, chromatic aberration can not be sufficiently compensated.

According to the present invention, when a radial GRIN rod lens is combined, the configuration of which is a parallel plane plate, the radial GRIN rod lens having a refractive index distribution in the radial direction perpendicular to the optical axis, chromatic aberration on the axis and chromatic aberration of magnification generated in a lens system, the refractive index of which is homogeneous, can be compensated.

Specifically, the lens system is constructed as follows: One piece of radial GRIN rod lens is provided on the object side, and at least one piece of lens, the refractive index of which is homogeneous, is provided on the image side.

In the case where two lenses, the refractive index of which is homogeneous, are provided, at least one of them is preferably made of glass, and the other is preferably made of plastics. At least one of the surfaces of the lens, the refractive index of which is homogeneous, may be aspherical, and at least one piece of radial GRIN rod lens may be provided respectively before and behind the aperture stop.

The radial GRIN rod lens may be made of plastics, and the refractive index of the lens is increased a location on the lens is farther away from the optical axis, and the value vd of color dispersion of the lens is decreased.

Specifically, the refractive index nd(1) of d-line and the color dispersion νd(1) on the optical axis are expressed as follows.

$$1.4 < nd(1) < 1.6 \quad (10)$$

$$30 < vd(1) < 70 \ldots \quad (11)$$

Further, the refractive index nd(2) of d-line and the color dispersion νd(2) at the end of the effective diameter of the lens are expressed as follows.

$$1.5 < nd(2) < 1.7 \ldots \quad (12)$$

$$15 < vd(2) < 55 \ldots \quad (13)$$

where $$vd(1) = \{nd(1) - 1\} / \{nF(1) - nc(1)\}$$

$$vd(2) = \{nd(2) - 1\} / \{nF(2) - nc(2)\}$$

nF (1), nc (1): the refractive indexes of F-line and C-line on the optical axis nF (2), nc (2): the refractive indexes of F-line and C-line at the end of the effective diameter Further, the refractive index nd and color dispersion νd satisfy the following inequality.

$$0 < \{nd(2) - nd(1)\} / \{vd(1) - vd(2)\} < 0.05 \ldots \quad (14)$$

It is preferable that the following lenses are arranged in the optical system by at least one with respect to each lens: one is a lens formed into the configuration of a parallel plane plate, the refractive index of which is increased as a location on the lens is farther away from the optical axis, and the lens has a refractive index distribution in the radial direction perpendicular to the optical axis; and the other is a lens formed into the configuration of a parallel plane plate, the refractive index of which is decreased as a location on the lens is farther away from the optical axis, and the lens has a refractive index distribution in the radial direction perpendicular to the optical axis. Alternatively, it is preferable that the following lenses are arranged on the same side with respect to the aperture stop in the optical system: one is a convex lens of the homogeneous refractive index; and the other is a lens formed into the configuration of a parallel plane plate, the refractive index of which is increased and the color dispersion νd of which is decreased as it is separate from the optical axis, and the lens has a refractive index distribution in the radial direction perpendicular to the optical axis.

When the radial GRIN rod lenses are respectively disposed on the front and rear sides of the stop in the lens system having the inner stop, it is possible to compensate only ON-axis chromatic aberration, and it is also possible to remove the remaining chromatic aberration of magnification when the thicknesses of the radial GRIN lenses on the front and rear sides are adjusted.

In the case of a lens of which the F-number is relatively bright, it is possible to compensate the remaining ON-axis chromatic aberration and chromatic aberration of magnification by the radial GRIN rod lens when two pieces of homogeneous lenses including an aspherical surface lens are used.

It is also possible to compensate not only chromatic aberration but also coma when two pieces of radial GRIN rod lenses, the configuration of which is a parallel plane plate, are provided in one lens system, wherein on lens functions as a concave lens and the other lens functions as a convex lens.

Methods for effectively arranging the radial rod GRIN lenses are described as follows.

(1) When the radial rod GRIN lense is arranged at a position separate from the stop, chromatic aberration of magnification can be effectively removed, and also coma caused in the radial GRIN rod lens can be suppressed.

(2) When one radial GRIN rod lens is arranged on the front side of the stop and the other radial GRIN rod lens is arranged on the rear side of the stop, while coma caused in the radial GRIN rod lenses is compensated by the radial GRIN rod lenses themselves, chromatic aberration can be compensated.

(3) When a radial GRIN rod lens functioning as a concave lens and a radial GRIN rod lens functioning as a convex lens are arranged, coma can be compensated.

In this connection, in the case where the radial GRIN rod lens is made of plastics, in general, the refractive index of plastics satisfies the following inequalities.

$$1.4 < n < 1.7, \ 15 < vd < 70$$

In this case, there is a tendency that the higher the refractive index, the lower the color dispersion νd. Accordingly, from the viewpoint of manufacture, it is easy to obtain lenses in which the expressions (10) to (14) are satisfied. Both ON-axis chromatic aberration and chromatic aberration of magnification can be compensated when the radial GRIN rod lense and the convex lens of the homogeneous refractive index are disposed on the same side with respect to the stop.

Examples of the present invention will be described as follows. Characters shown in the following tables are defined as follows.

r: Radius of curvature of the refractive surface d: Interval of surfaces nd: Refractive index of d-line of lens material
vd: Abbe's number of lens material
f: Focal distance
F: F-number
ω: Half field angle
Refractive index distribution function
$ni = n_0 i + n_1 i h^2 + n_2 i h^4$
h: Height from the optical axis
i: Wave length of each of d-line, F-line and C-line In this case, an aspherical surface is expressed by the expression 3.

$$X = \frac{h^2/r}{1 + \sqrt{1-(K+1)h^2/r^2}} + A_4 h^4 + A_6 h^6 + A_8 h^8 + A_{10} h^{10}$$ [Expression 3]

K: Circular cone constant
Ai: Each aspherical surface coefficient

Figure 11:
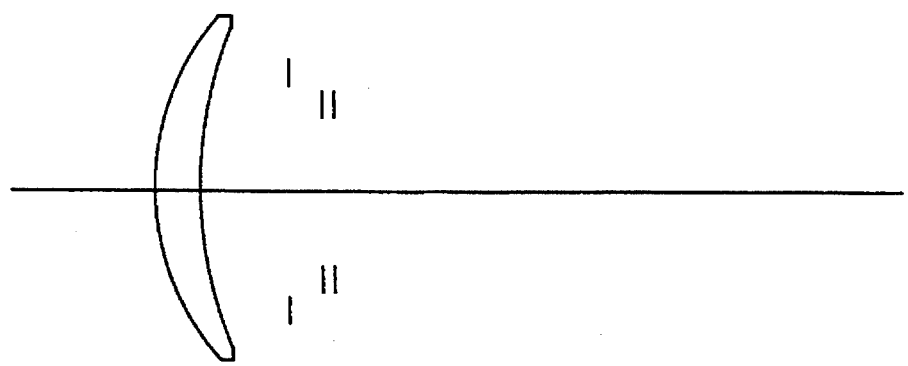
FIG. 11 is a sectional view of the conventional lens system.
Figure 12:
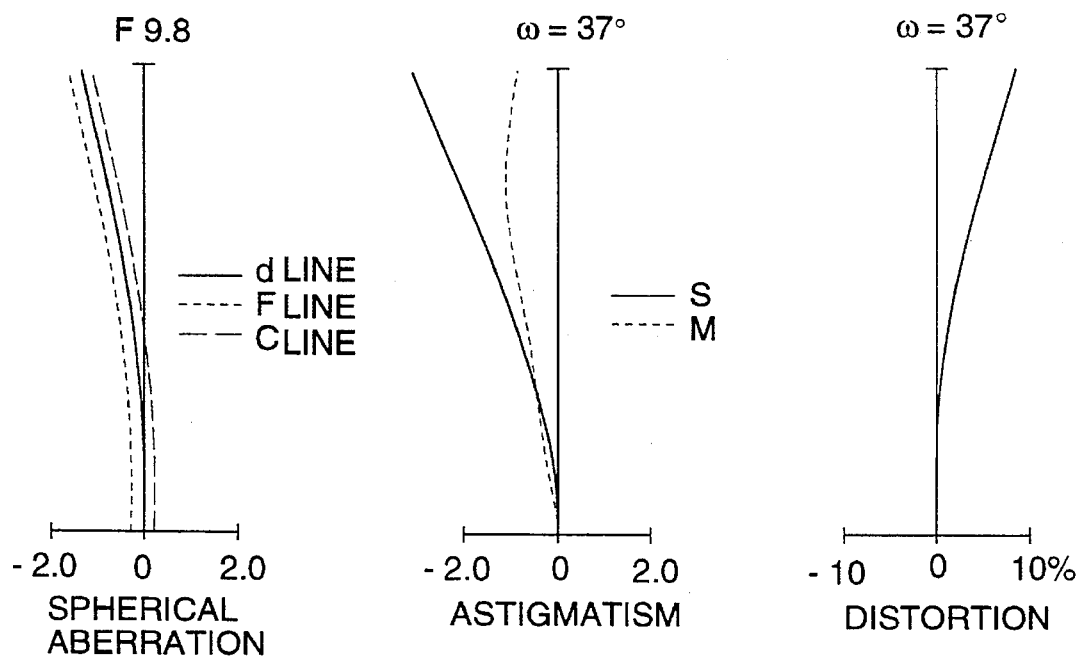
FIG. 12 is an aberration diagram of the lens system shown in FIG. 11.
Figure 12:
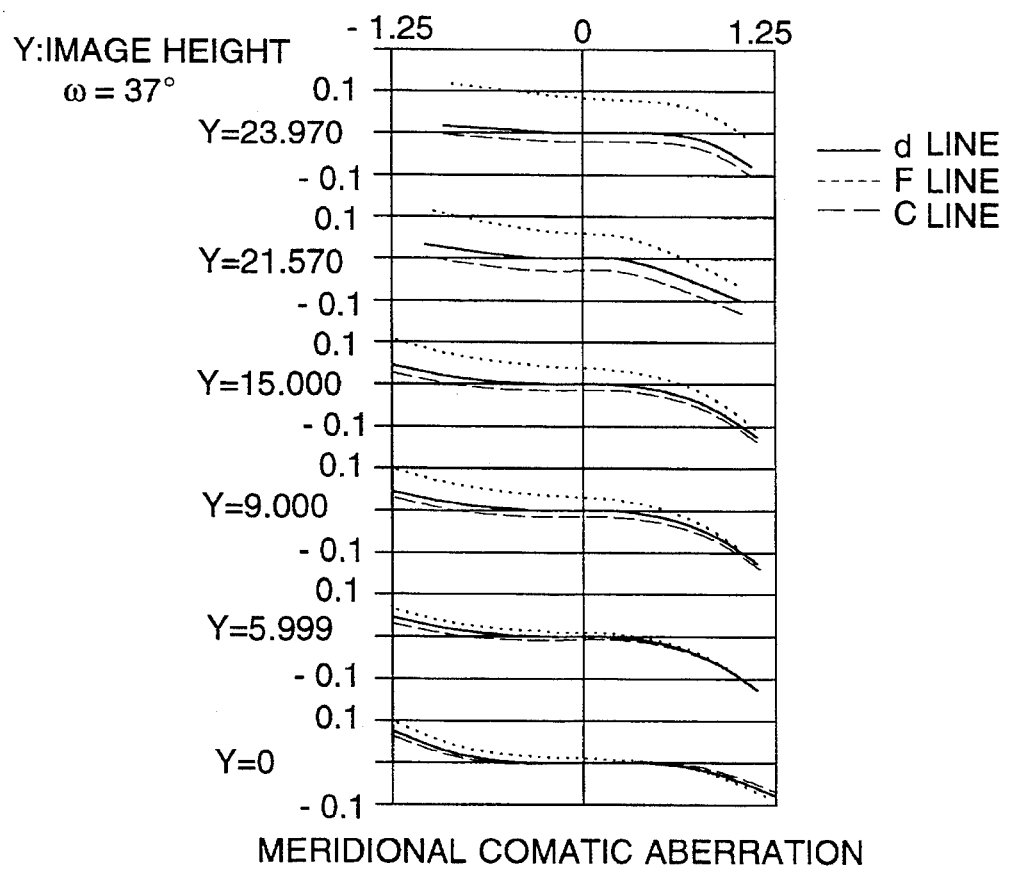

For comparison, a sectional view of the conventional lens is shown in FIG. 11, the aberration diagram is shown in FIG. 12, and the lens data is shown in the following table.

| | f = 28.8 | F9.8 | ω = 37° | |
|---|---|---|---|---|
| Surface No. | r | d | nd | vd |
| 1 | 5.095 | 0.9 | 1.492 | 57 |
| 2 | 7.492 | 1.8 | | |
| 3 | Off-axis luminous flux stop (φ3.8) | 0.8 | | |
| 4 | Aperture stop (φ2.5) | 0.2 | | |
| 5 | Off-axis luminous flux stop (φ2.5) | | | |

Figure 2:
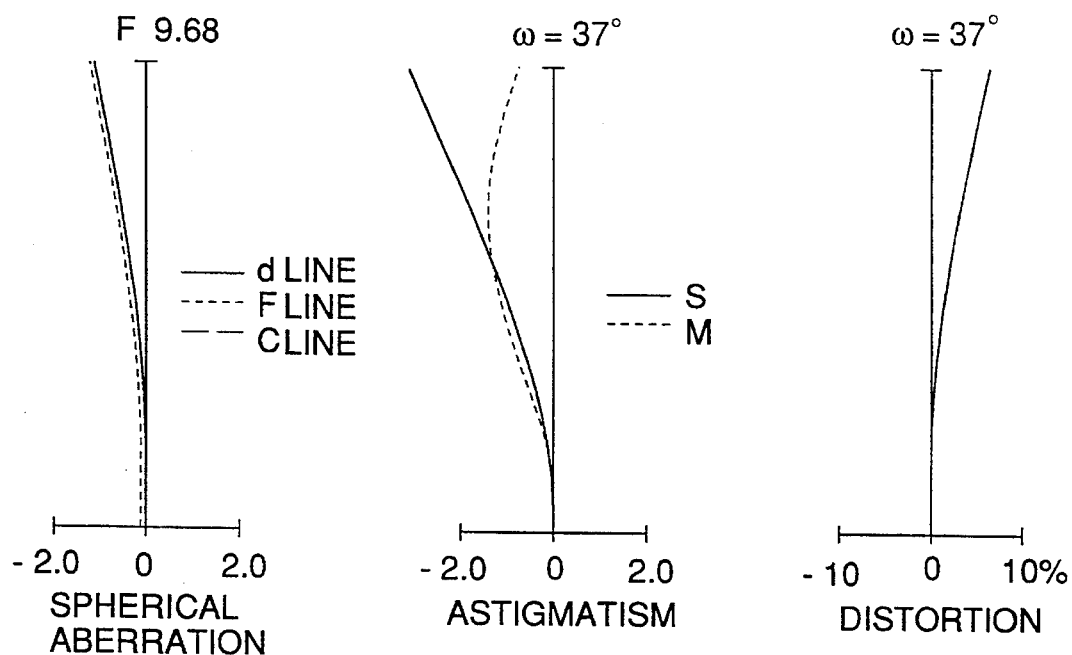
FIG. 2 is an aberration diagram of the first embodiment of the picture-taking lens system of the present invention.
Figure 2:
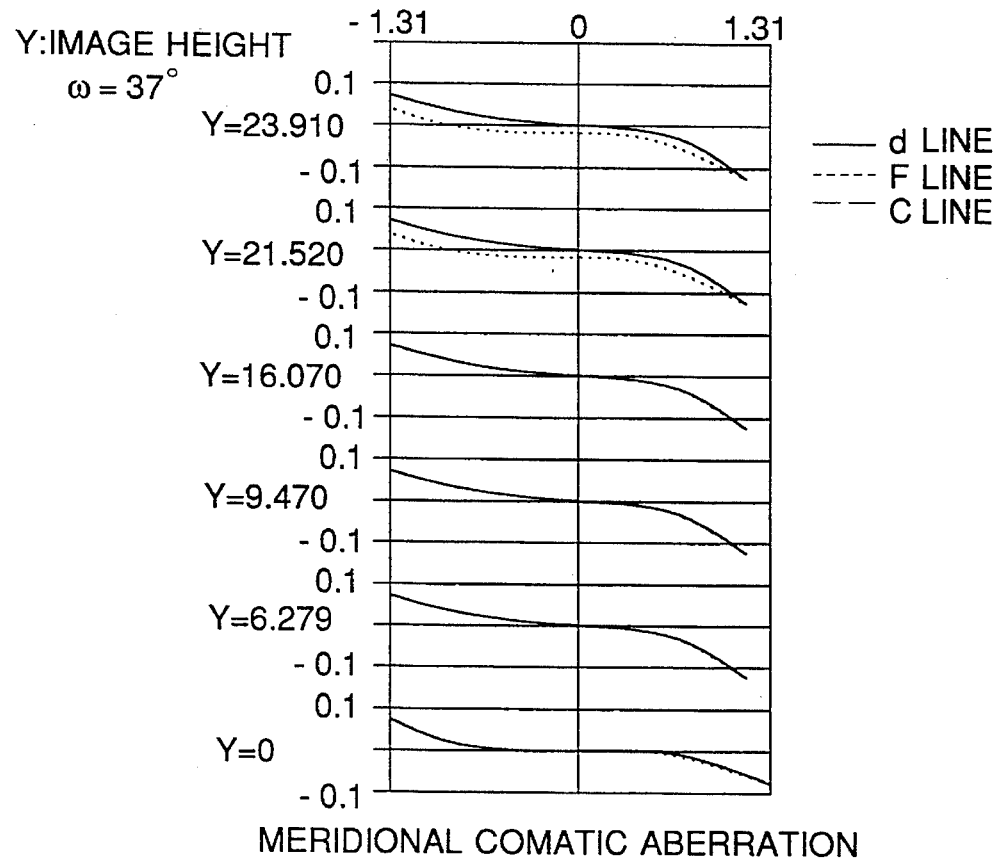

Next, the first example is shown as follows. The lens data of the first example is shown in the following table. The sectional view of the lens of the first example is shown in FIG. 1, and the aberration diagram is shown in FIG. 2.

| | f = 29.4 | F9.68 | ω = 37° | |
|---|---|---|---|---|
| Surface No. | r | d | nd | vd |
| 1 | ∞ | 1.0 | Radial GRIN rod lens | |
| 2 | ∞ | 0.2 | | |
| 3 | (Aspherical surface) 5.685 | 1.0 | 1.492 | 57 |
| 4 | 9.470 | 2.1 | | |
| 5 | Off-axis luminous flux stop (φ3.6) | 0.5 | | |
| 6 | Aperture stop (φ2.6) | 0.2 | | |
| 7 | Off-axis luminous flux stop (φ2.6) | | | |

| Refractive index distribution function | |
|---|---|
| $n_0 i$ | $n_1 i$ |
| d | 1.52206 | 0.17584 × 10⁻² |
| F | 1.53056 | 0.19648 × 10⁻² |
| C | 1.51850 | 0.16804 × 10⁻² |

Aspherical surface k = 0.044154    $A_4 = A_6 = A_8 = A_{10} = 0$

Effective radius of the radial GRIN rod lens is 5 mm.
nd(1) = 1.52206    vd(1) = 43
nd(2) = 1.56602    vd(2) = 29
{nd(2) − nd(1)}/{vd(1) − vd(2)} = 0.0031

Figure 3:
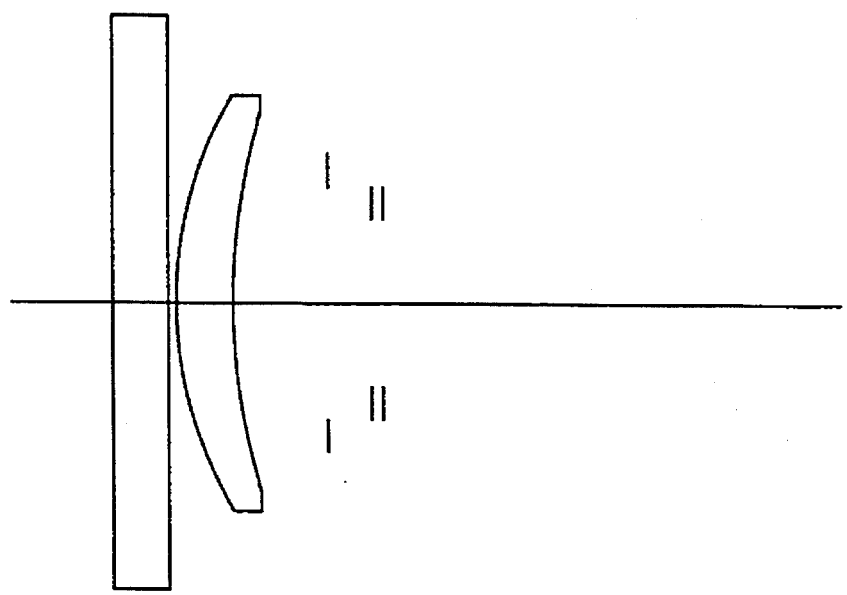
FIG. 3 is a sectional view showing the second embodiment of the picture-taking lens system of the present invention.
Figure 4:
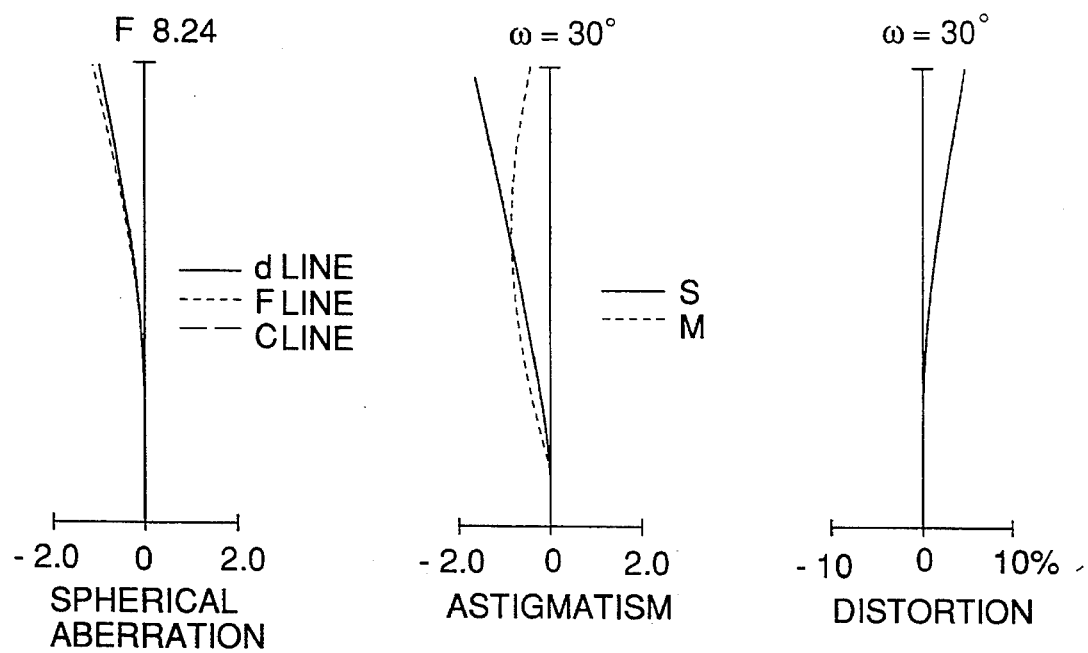
FIG. 4 is an aberration diagram of the second embodiment of the picture-taking lens system of the present invention.
Figure 4:
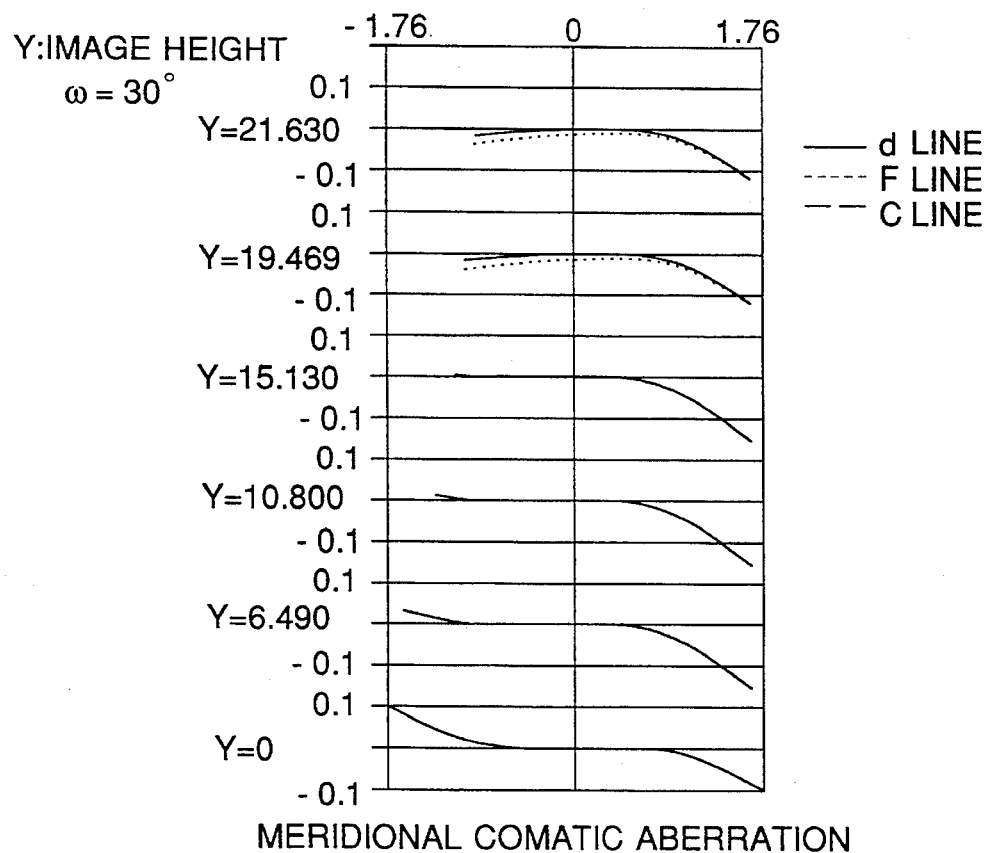

The second example is shown as follows. The lens data of the second example is shown in the following table. The sectional view of the lens of the second example is shown in FIG. 3, and the aberration diagram is shown in FIG. 4.

| | f = 35.0 | F8.24 | ω = 30° | |
|---|---|---|---|---|
| Surface No. | r | d | nd | vd |
| 1 | ∞ | 1.1 | Radial GRIN rod lens | |
| 2 | ∞ | 0.2 | | |
| 3 | 8.000 | 1.1 | 1.7725 | 49.6 |
| 4 | 11.342 | 2.6 | | |
| 5 | Off-axis luminous flux stop (φ4.0) | 1.6 | | |
| 6 | Aperture stop (φ3.5) | 0.2 | | |
| 7 | Off-axis luminous flux stop (φ3.5) | | | |

| Refractive index distribution function | |
|---|---|
| $n_0 i$ | $n_1 i$ |
| d | 1.52206 | 0.17584 × 10⁻² |
| F | 1.53056 | 0.19648 × 10⁻² |
| C | 1.51850 | 0.16804 × 10⁻² |

Effective radius of the radial GRIN rod lens is 5 mm.
nd(1) = 1.52206    vd(1) = 43
nd(2) = 1.56602    vd(2) = 29
{nd(2) − nd(1)}/{vd(1) − vd(2)} = 0.0031

Figure 5:
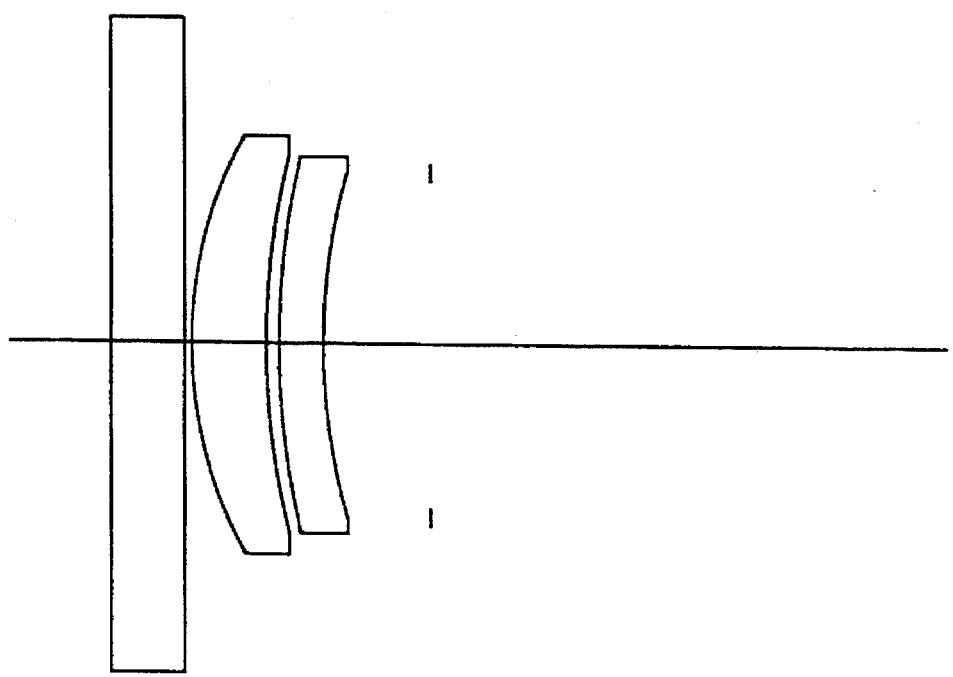
FIG. 5 is a sectional view showing the third embodiment of the picture-taking lens system of the present invention.
Figure 6:
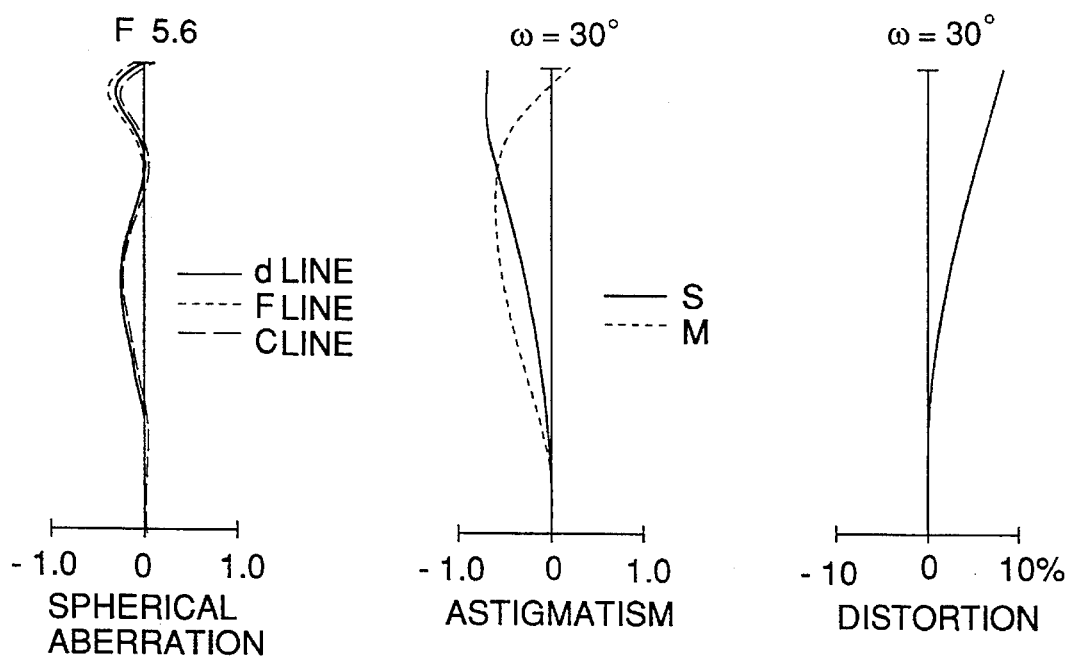
FIG. 6 is an aberration diagram of the third embodiment of the picture-taking lens system of the present invention.
Figure 6:
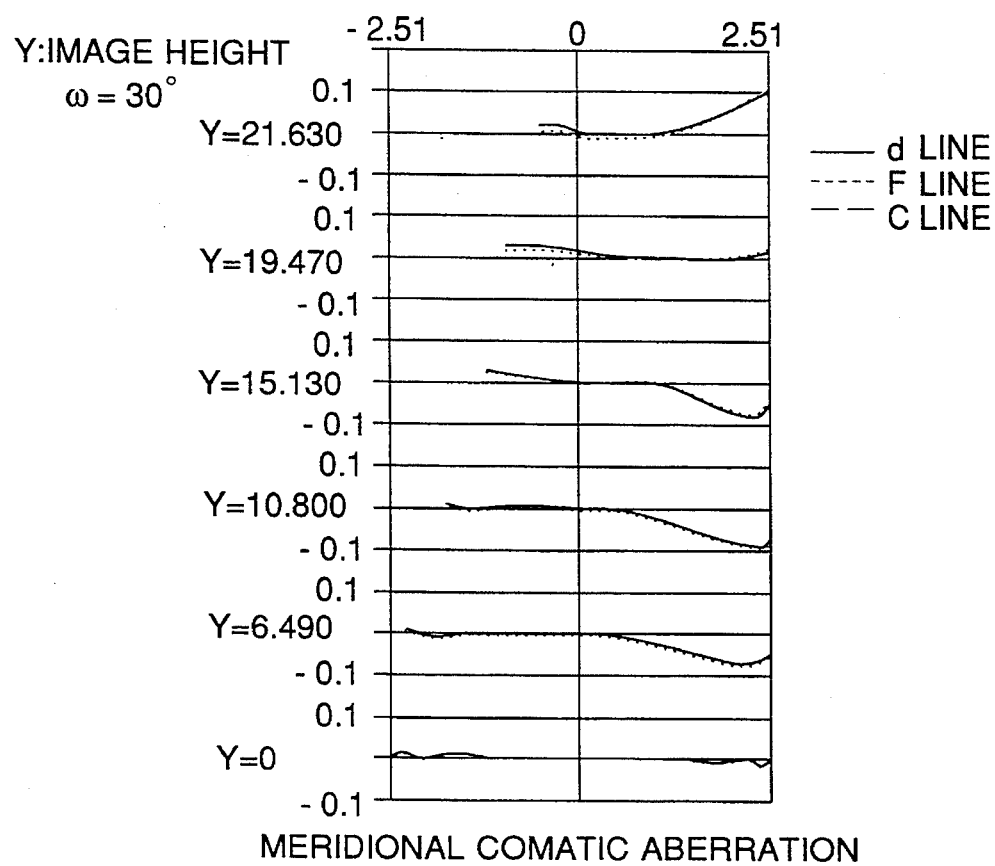

The third example is shown as follows. The lens data of the third example is shown in the following table. The sectional view of the lens of the third example is shown in FIG. 5, and the aberration diagram is shown in FIG. 6.

| | f = 35.0 | F5.6 | ω = 30° | |
|---|---|---|---|---|
| Surface No. | r | d | nd | vd |
| 1 | ∞ | 1.5 | Radial GRIN rod lens | |
| 2 | ∞ | 0.1 | | |
| 3 | 6.355 | 1.3 | 1.7725 | 49.6 |
| 4 | 11.726 | 0.2 | | |
| 5 | (Aspherical surface) 13.338 | 1.0 | 1.492 | 57 |
| 6 | (Aspherical surface) 6.817 | 2.0 | | |
| 7 | Aperture Stop (φ5.0) | | | |

| Refractive index distribution function | |
|---|---|
| $n_0 i$ | $n_1 i$ |
| d | 1.52206 | 0.17584 × 10⁻² |
| F | 1.53056 | 0.19648 × 10⁻² |
| C | 1.51850 | 0.16804 × 10⁻² |

Aspherical surface coefficient

Fifth surface   K = 4.0143
$A_4 = 0.90352 \times 10^{-3}$   $A_6 = -0.27578 \times 10^{-4}$
$A_8 = 0.29421 \times 10^{-5}$   $A_{10} = -0.15117 \times 10^{-6}$ Sixth surface   K = 3.6795
$A_4 = 0.61862 \times 10^{-3}$   $A_6 = -0.20367 \times 10^{-3}$
$A_8 = 0.36071 \times 10^{-4}$   $A_{10} = -0.40855 \times 10^{-5}$ Effective radius of the radial GRIN rod lens is 4.4 mm.
nd(1) = 1.52206    vd(1) = 43
nd(2) = 1.55610    vd(2) = 32

$\{nd(2) - nd(1)\}/\{(vd(1) - vd(2)\} = 0.0031$

Figure 7:
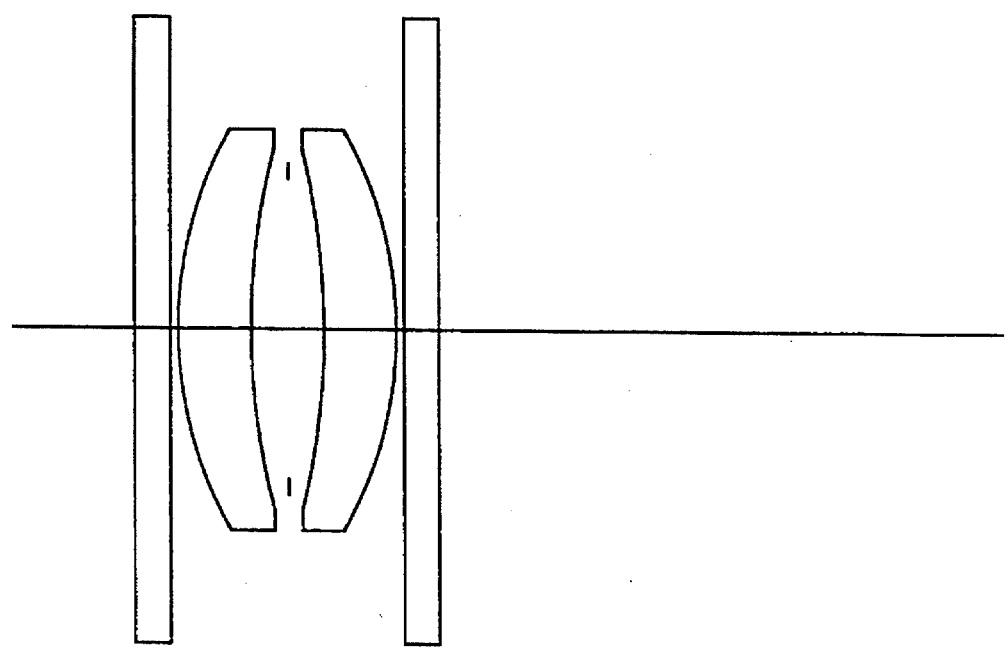
FIG. 7 is a sectional view showing the fourth embodiment of the picture-taking lens system of the present invention.
Figure 8:
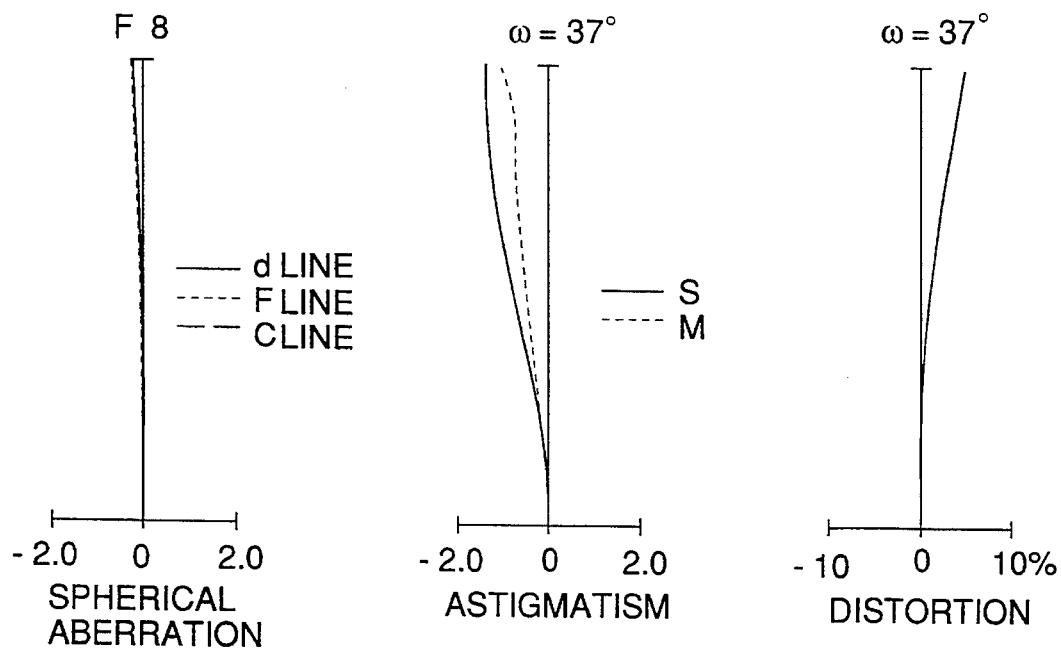
FIG. 8 is an aberration diagram of the fourth embodiment of the picture-taking lens system of the present invention.
Figure 8:
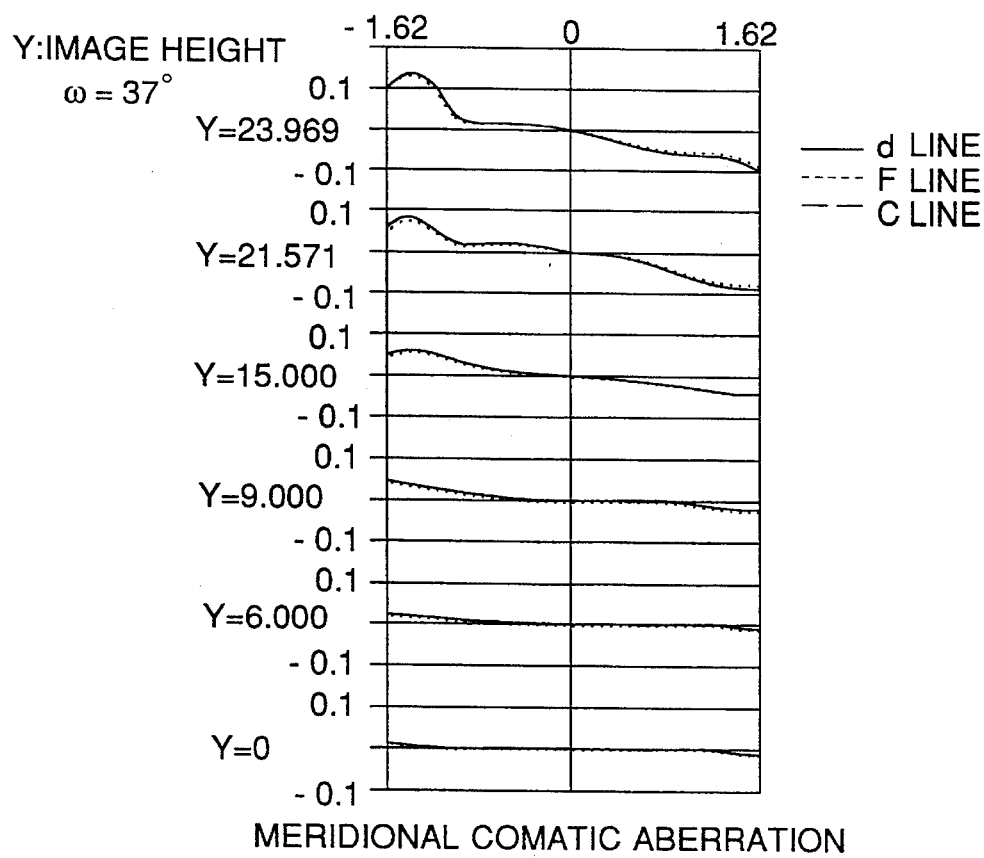

The fourth example is shown as follows. The lens data of the fourth example is shown in the following table. The sectional view of the lens of the fourth example is shown in FIG. 7, and the aberration diagram is shown in FIG. 8.

| Surface No. | f = 30.39 | F8 | ω = 37° | |
|---|---|---|---|---|
| | r | d | nd | vd |
| 1 | ∞ | 0.80 | Radial GRIN rod lens 1 | |
| 2 | ∞ | 0.10 | | |
| 3 | (Aspherical surface) 6.660 | 1.72 | 1.492 | 57 |
| 4 | 17.566 | 0.39 | | |
| 5 | Aperture Stop (φ3.2) | 0.70 | | |
| 6 | −5.097 | 1.56 | 1.583 | 30 |
| 7 | (Aspherical surface) −6.098 | 0.10 | | |
| 8 | ∞ | 0.80 | Radial GRIN rod lens 2 | |
| 9 | ∞ | | | |

| Refractive index distribution function (common between 1 and 2) | | |
|---|---|---|
| | $n_0 i$ | $n_1 i$ |
| d | 1.51544 | $0.13133 \times 10^{-2}$ |
| F | 1.52410 | $0.14555 \times 10^{-2}$ |
| C | 1.51181 | $0.12581 \times 10^{-2}$ |

| Aspherical surface coefficient | | |
|---|---|---|
| Third surface | $K = 0.34708 \times 10^{-2}$ | |
| | $A_4 = 0.88764 \times 10^{-3}$ | $A_6 = -0.12139 \times 10^{-4}$ |
| | $A_8 = 0.11303 \times 10^{-4}$ | $A_{10} = -0.20622 \times 10^{-6}$ |
| Seventh surface | $K = -0.35023$ | |
| | $A_4 = 0.73951 \times 10^{-3}$ | $A_6 = -0.45899 \times 10^{-4}$ |
| | $A_8 = 0.15859 \times 10^{-4}$ | $A_{10} = -0.60102 \times 10^{-6}$ |

Figure 9:
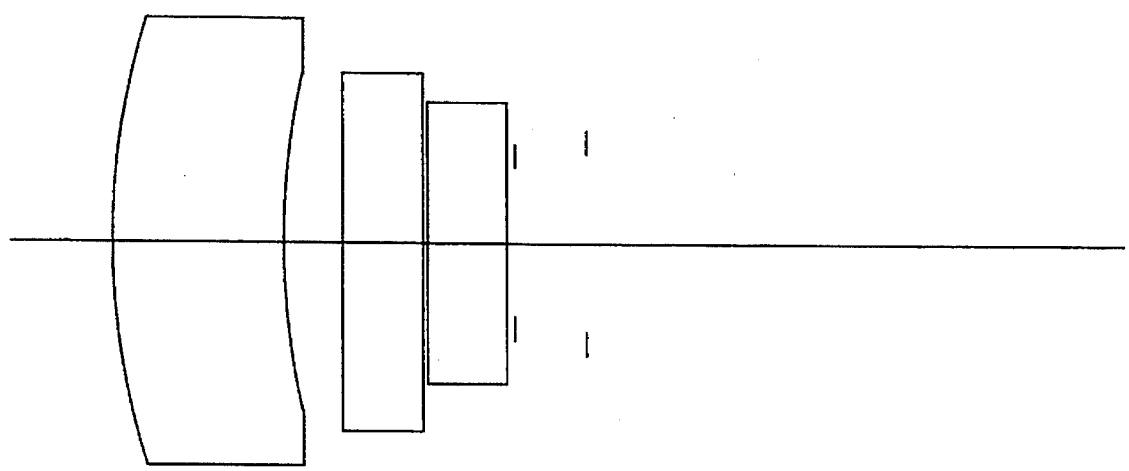
FIG. 9 is a sectional view showing the fifth embodiment of the picture-taking lens system of the present invention.
Figure 10:
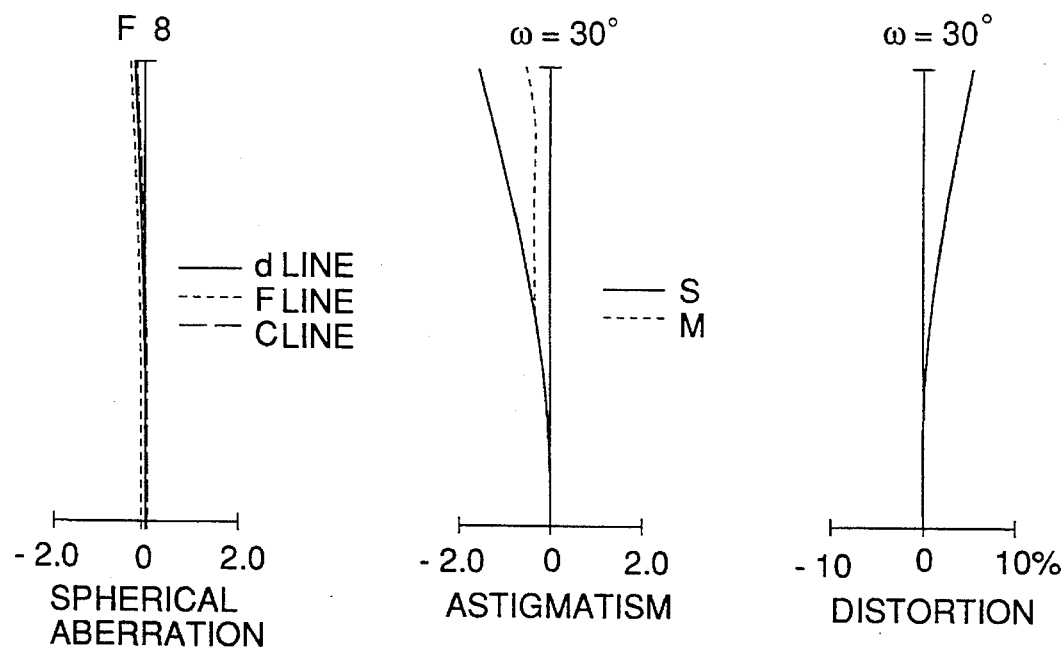
FIG. 10 is an aberration diagram of the fifth embodiment of the picture-taking lens system of the present invention.
Figure 10:
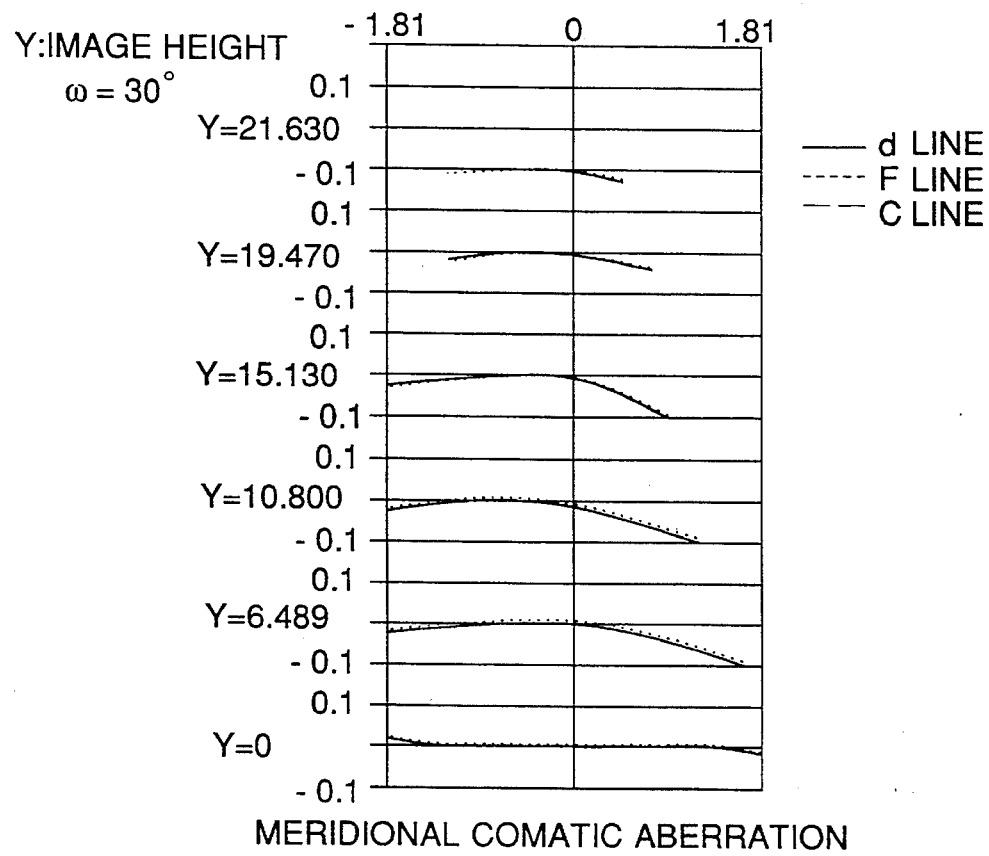

Effective radius of the radial GRIN rod lens 1 is 3.64 mm.
nd(1) = 1.51544    vd(1) = 42
nd(2) = 1.53284    vd(2) = 36
$\{nd(2) - nd(1)\}/\{vd(1) - vd(2)\} = 0.00029$
Effective radius of the radial GRIN rod lens 2 is 3.46 mm.
nd(1) = 1.51544    vd(1) = 42
nd(2) = 1.53116    vd(2) = 36
$\{nd(2) - nd(1)\}/\{vd(1) - vd(2)\} = 0.00026$ The fifth example is shown as follows. The lens data of the fifth example is shown in the following table. The sectional view of the lens of the fifth example is shown in FIG. 9, and the aberration diagram is shown in FIG. 10.

| Surface No. | f = 35.04 | F8 | ω = 30° | |
|---|---|---|---|---|
| | r | d | nd | vd |
| 1 | 12.5 | 4.0 | 1.834 | 37.2 |
| 2 | 23.960 | 0.5 | | |
| 3 | ∞ | 2.0 | Radial GRIN rod lens 1 | |
| 4 | ∞ | 0.1 | | |
| 5 | ∞ | 2.0 | Radial GRIN rod lens 2 | |
| 6 | ∞ | 0.2 | | |
| 7 | Aperture Stop (φ3.6) | 2.05 | | |
| 8 | Off-axis luminous flux stop (φ4.0) | | | |

| Refractive index distribution function | | |
|---|---|---|
| Radial GRIN rod lens 1 | | |
| | $n_0 i$ | $n_1 i$ |
| d | 1.52206 | 0.01425 |
| F | 1.53056 | 0.01490 |
| C | 1.51850 | 0.01400 |
| Radial GRIN rod lens 2 | | |
| | $n_0 i$ | $n_1 i$ |
| d | 1.56602 | −0.01175 |
| F | 1.57968 | −0.01217 |
| C | 1.56051 | −0.01159 |

Effective radius of the radial GRIN rod lens 1 is 3.3 mm.
nd(1) = 1.52206    vd(1) = 42
nd(2) = 1.67724    vd(2) = 31
$\{nd(2) - nd(1)\}/\{vd(1) - vd(2)\} = 0.014$
Effective radius of the radial GRIN rod lens 2 is 2.6 mm.
nd(1) = 1.56602    vd(1) = 29
nd(2) = 1.48659    vd(2) = 32
$\{nd(2) - nd(1)\}/\{vd(1) - vd(2)\} = 0.026$ In this example, the radial GRIN rod lens 1 functions as a concave lens, and the radial GRIN rod lens 2 functions as a convex lens.

An example in which the present invention is applied to a zoom lens is shown here. For example, in a zoom lens in which the lens groups are disposed from the object side in the order of a positive group, negative group, stop, positive group and positive group, it is possible to reduce the front lens diameter when the radial GRIN rod lens is used for the second lens group.

Recently, there is a tendency that the size of charge coupled device (CCD) is reduced from ⅓ inch to ¼ inch. In accordance with the reduction of the size, the radius of curvature of the lens is also reduced. Therefore, it becomes difficult to machine the lens. When the optical system described above is subjected to achromatism by the radial GRIN rod lens, the radius of curvature of the homogeneous lens combined with it can be made gentle, so that the difficulty can be reduced in the process of machining.

In the case of a zoom lens, a large number of lenses are arranged for the purpose of achromatism. Therefore, the radial GRIN rod lens is advantageously used. In the case where monochromatic aberration can not be sufficiently compensated by this radial GRIN rod lens, an aspherical surface lens may be used for the homogeneous lens for the purpose of compensation.

Figure 13:
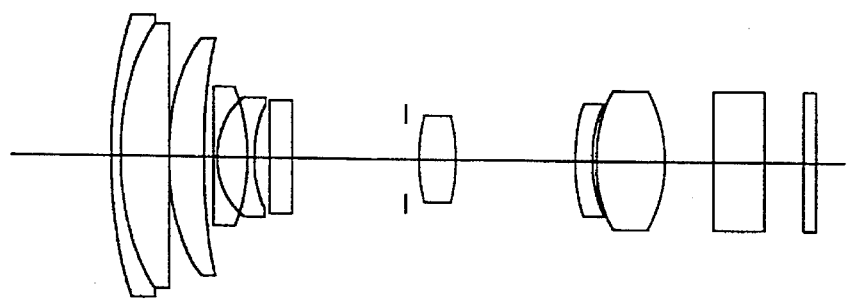
Figure 13:
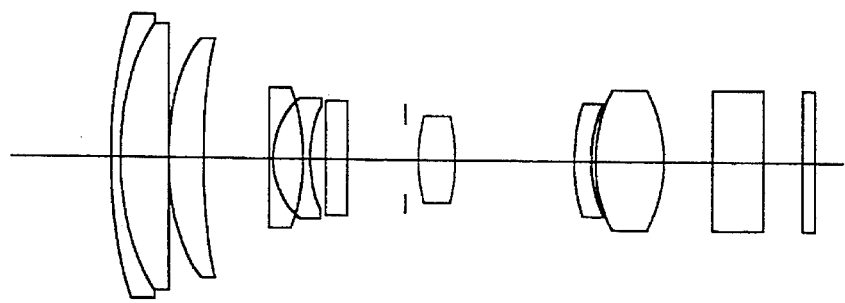
Figure 13:
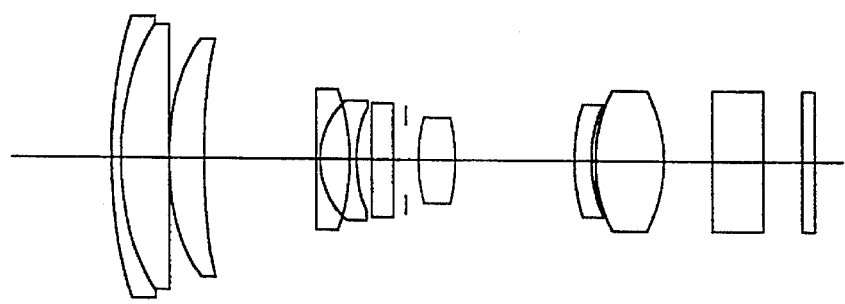
Figure 14:
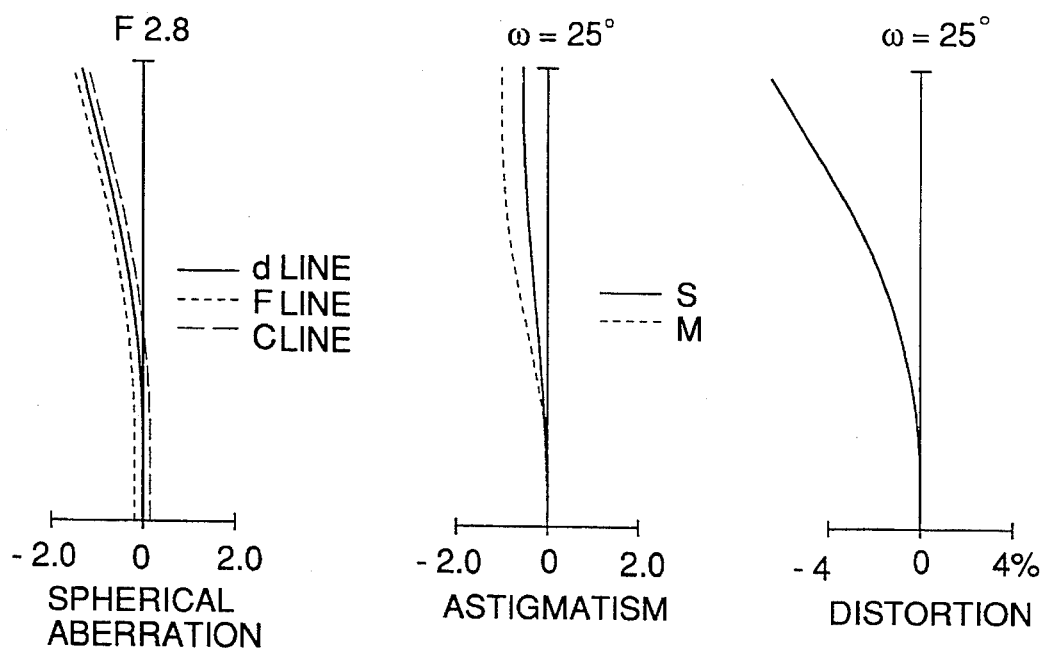
FIG. 14 is an aberration diagram of "wide angle" of the zoom lens system of the sixth embodiment of the present invention.
Figure 14:
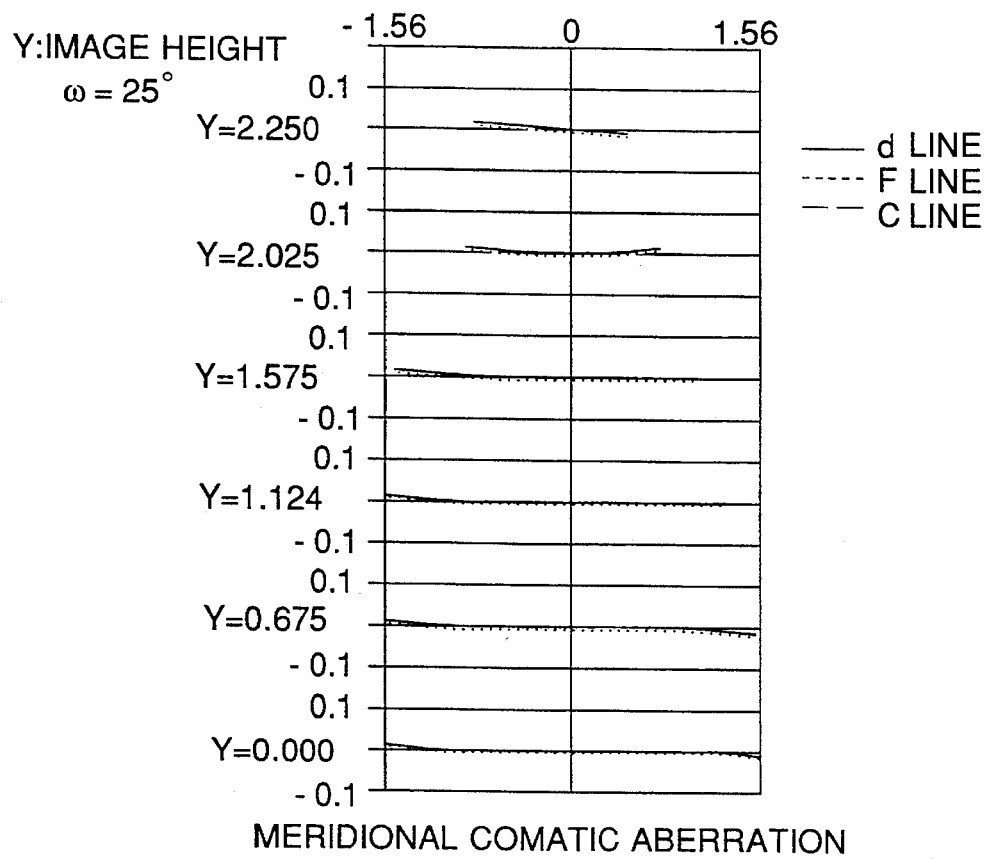
Figure 15:
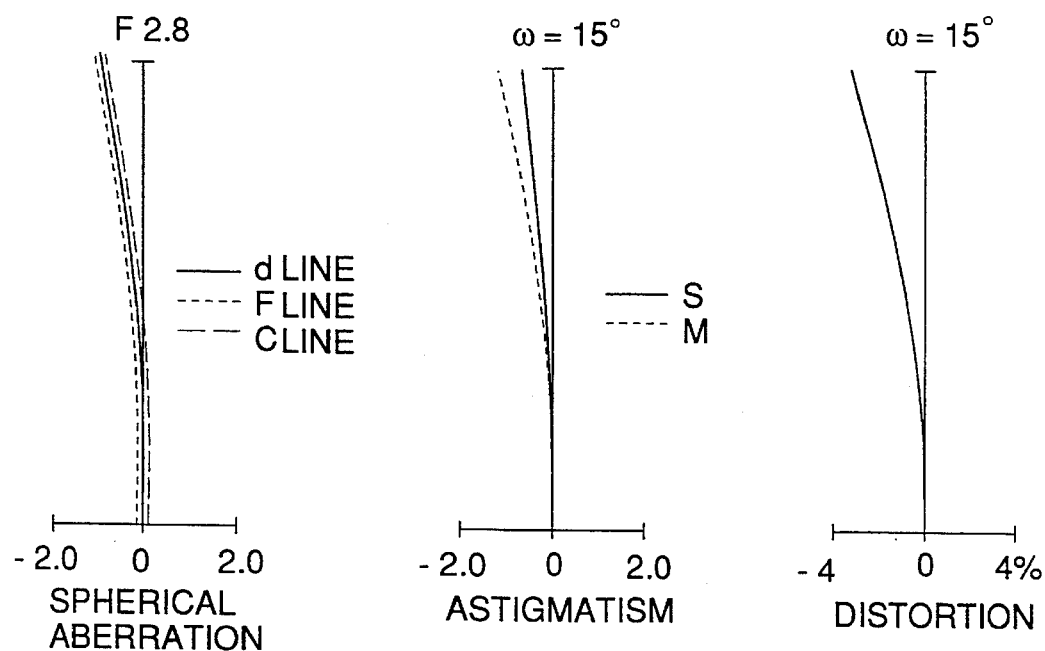
FIG. 15 is an aberration diagram of "intermediate" of the zoom lens system of the sixth embodiment of the present invention.
Figure 15:
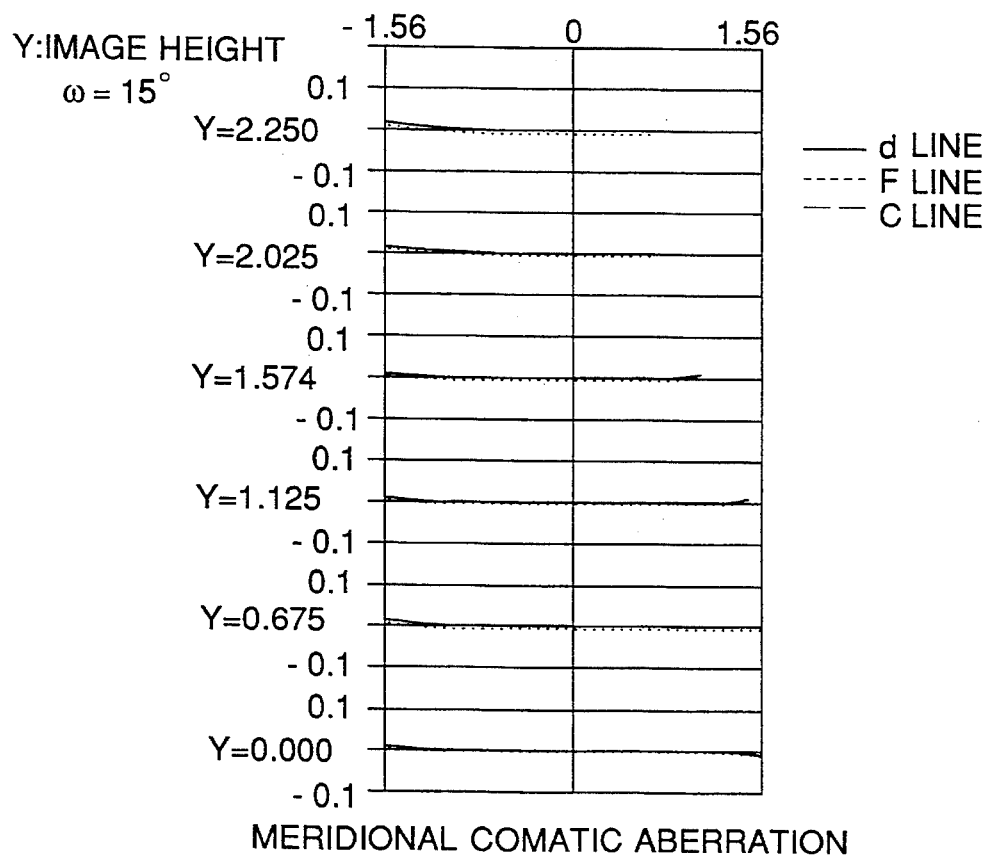
Figure 16:
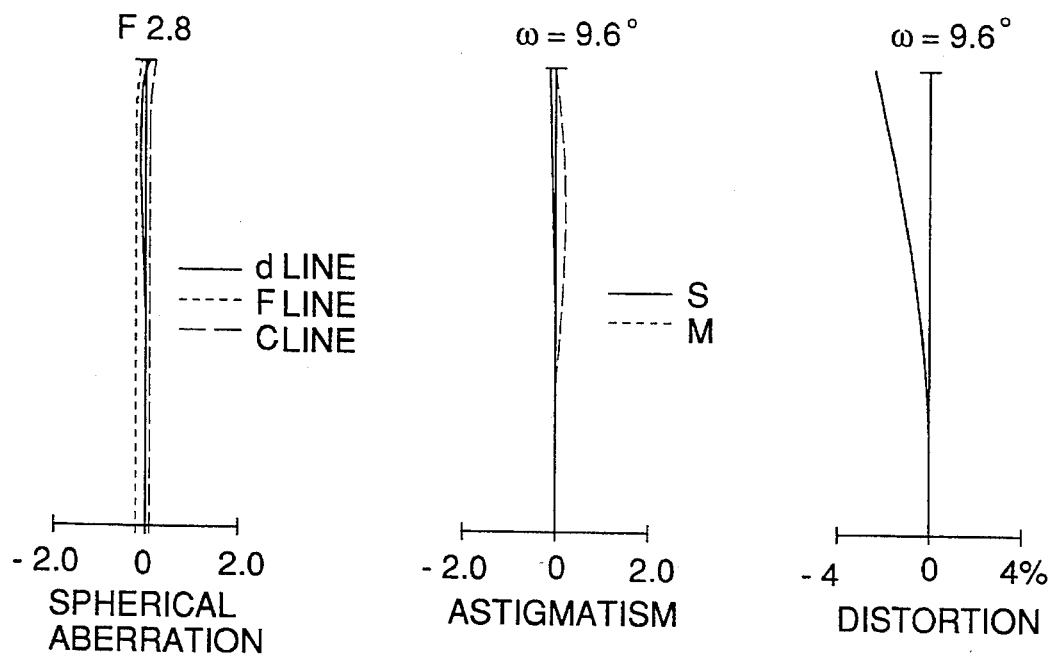
FIG. 16 is an aberration diagram of "telephoto" of the zoom lens system of the sixth embodiment of the present invention.
Figure 16:
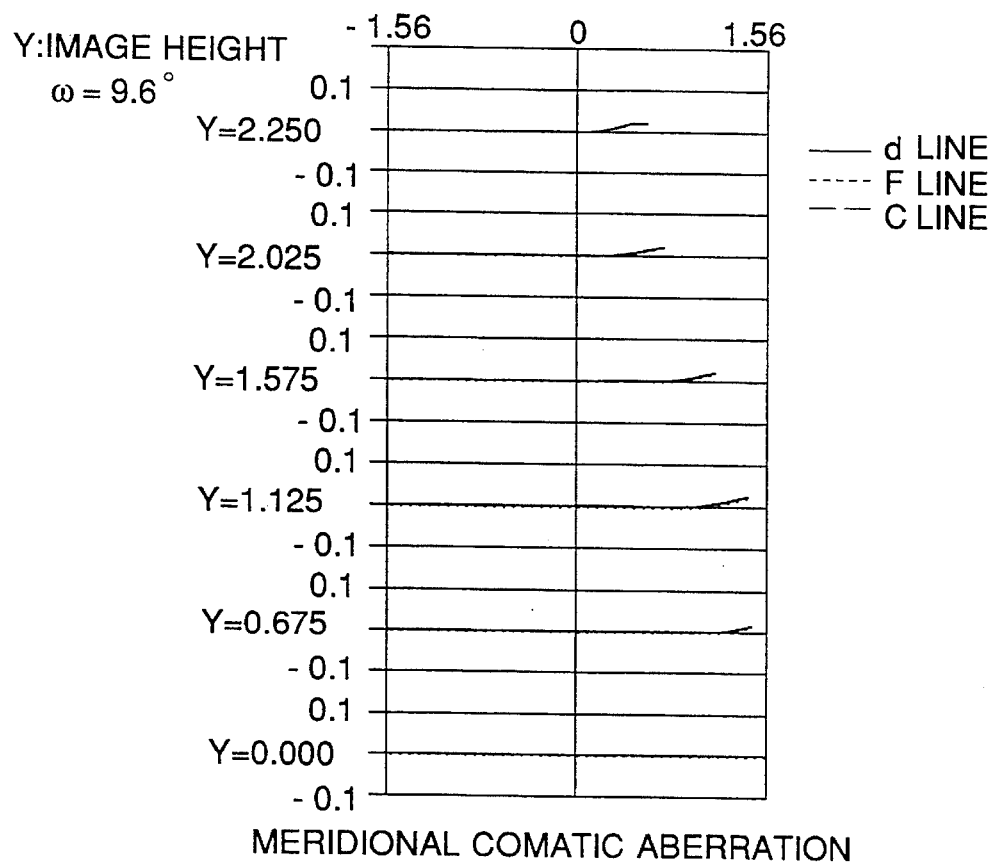

The lens data of the sixth example is shown in the following table. The sectional views of the lens of this example are shown in FIGS. 13(*a*) to 13(*c*), and the aberration diagrams are shown in FIGS. 14 to 16.

| Surface No. | f = 5.2–13.7 | F2.8 | ω = 25°–9.6° | |
|---|---|---|---|---|
| | r | d | nd | vd |
| 1 | 34.464 | 0.70 | 1.84666 | 23.8 |
| 2 | 16.154 | 2.50 | 1.72600 | 53.5 |
| 3 | −1702.755 | 0.10 | | |
| 4 | 10.687 | 2.70 | 1.77250 | 49.6 |
| 5 | 26.524 | Variable | | |
| 6 | 100.184 | 0.50 | 1.88300 | 40.8 |
| 7 | 5.005 | 1.20 | | |

-continued

| | | | | |
|---|---|---|---|---|
| 8 | −15.944 | 0.50 | 1.77250 | 49.6 |
| 9 | 25.295 | 0.50 | | |
| 10 | ∞ | 1.20 | Radial GRIN rod lens | |
| 11 | ∞ | Variable | | |
| 12 | 26.389 | 1.88 | 1.69680 | 55.5 |
| 13 | −17.378 | Variable | | |
| 14 | 9.803 | 0.60 | 1.92286 | 20.9 |
| 15 | 5.172 | 0.25 | | |
| 16 | 5.887 | 3.50 | 1.72916 | 54.7 |
| 17 | −12.304 | Variable | | |
| 18 | ∞ | 3.68 | 1.51633 | 64.1 |
| 19 | ∞ | 2.50 | | |
| 20 | ∞ | 0.80 | 1.51633 | 64.1 |
| 21 | ∞ | | | |

| | Surface interval | | |
|---|---|---|---|
| | Wide angle | Intermediate | Telephoto |
| $d_5$ | 0.5 | 3.2 | 5.0 |
| $d_{11}$ | 6.75 | 4.05 | 2.25 |
| $d_{13}$ | 5.47 | 4.78 | 4.75 |
| $d_{17}$ | 2.43 | 3.12 | 3.15 |

| Refractive index distribution coefficient of radial GRIN rod lens | | |
|---|---|---|
| | $n_0 i$ | $n_1 i$ |
| d | 1.56602 | $-0.70336 \times 10^{-2}$ |
| F | 1.57968 | $-0.78592 \times 10^{-2}$ |
| C | 1.56051 | $-0.67216 \times 10^{-2}$ |

Figure 17:
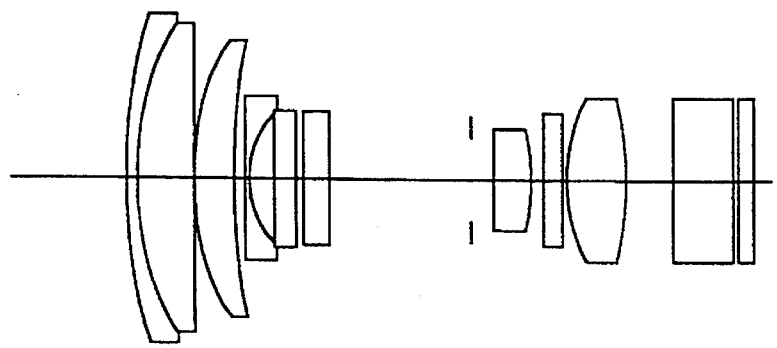
Figure 17:
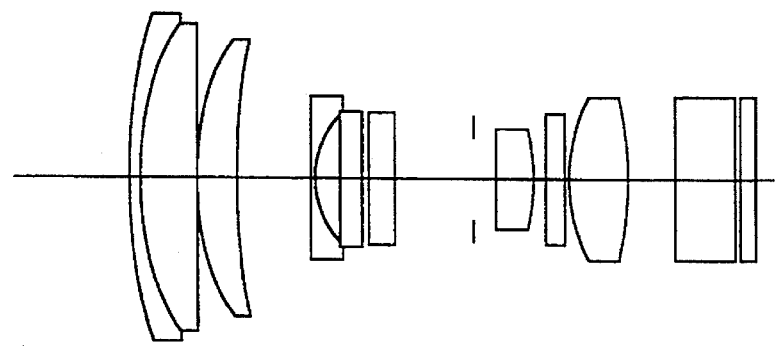
Figure 17:
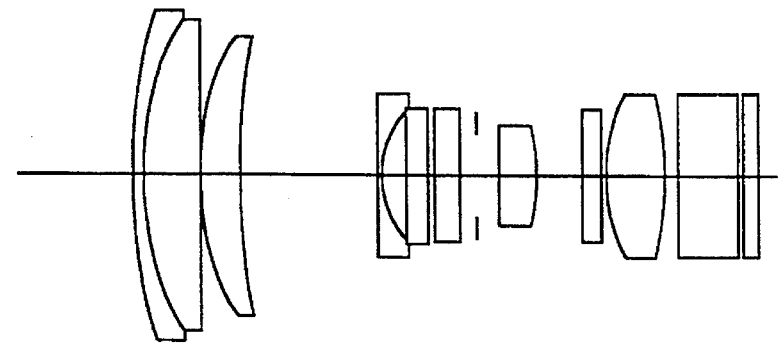
Figure 18:
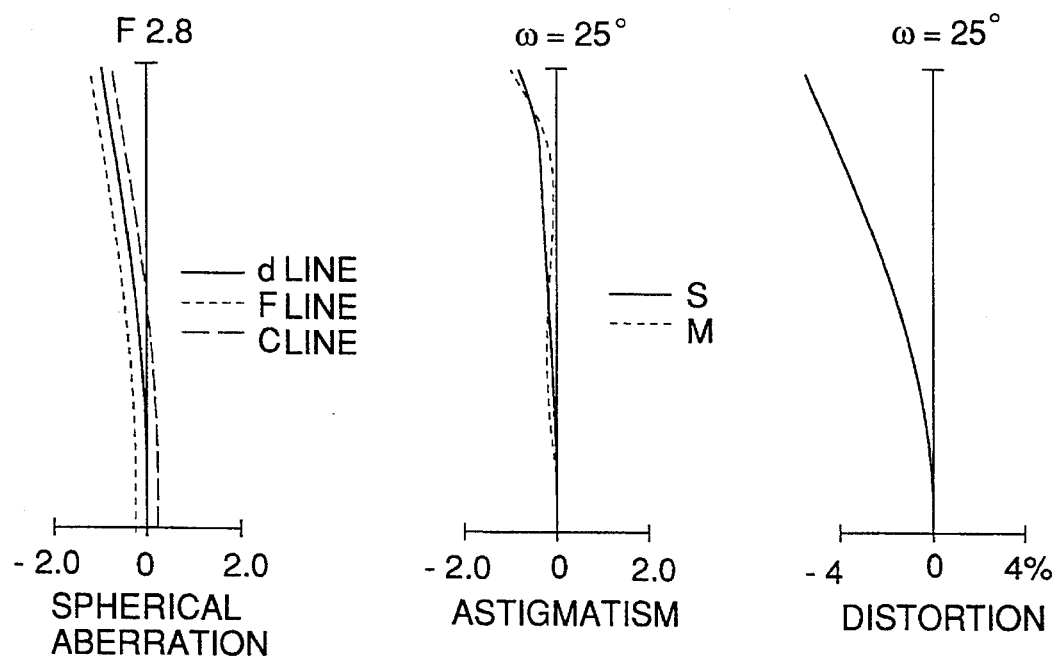
FIG. 18 is an aberration diagram of "wide angle" of the zoom lens system of the seventh embodiment of the present invention.
Figure 18:
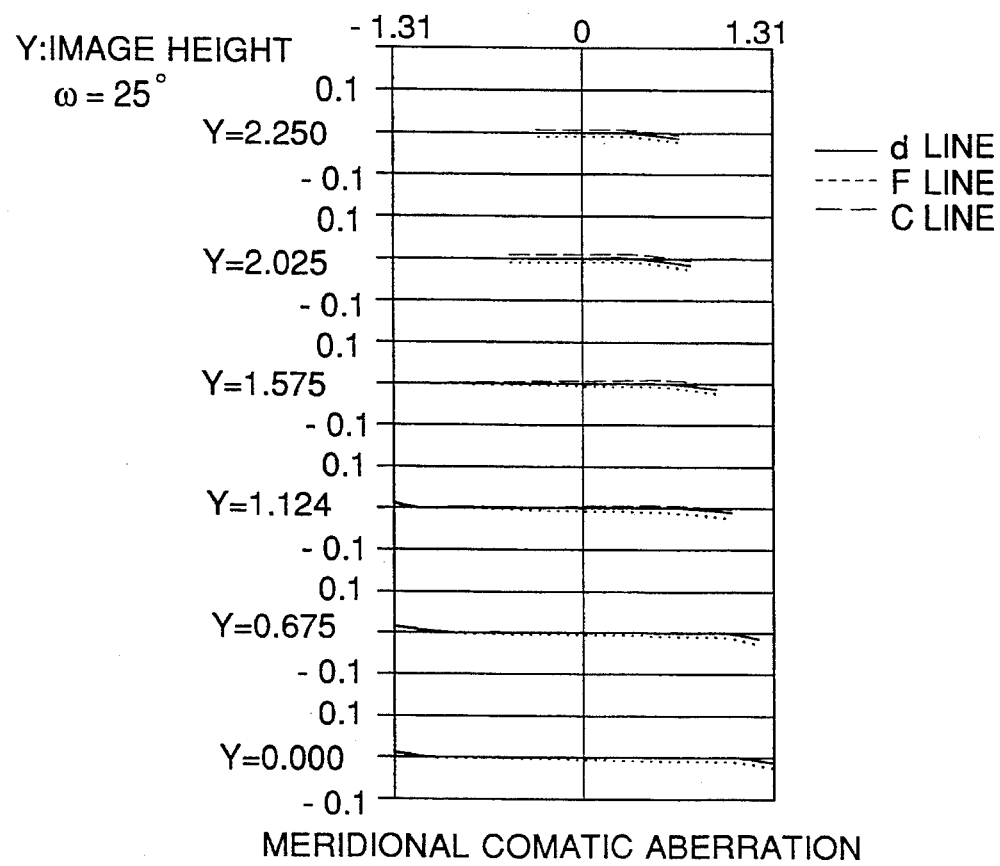
Figure 19:
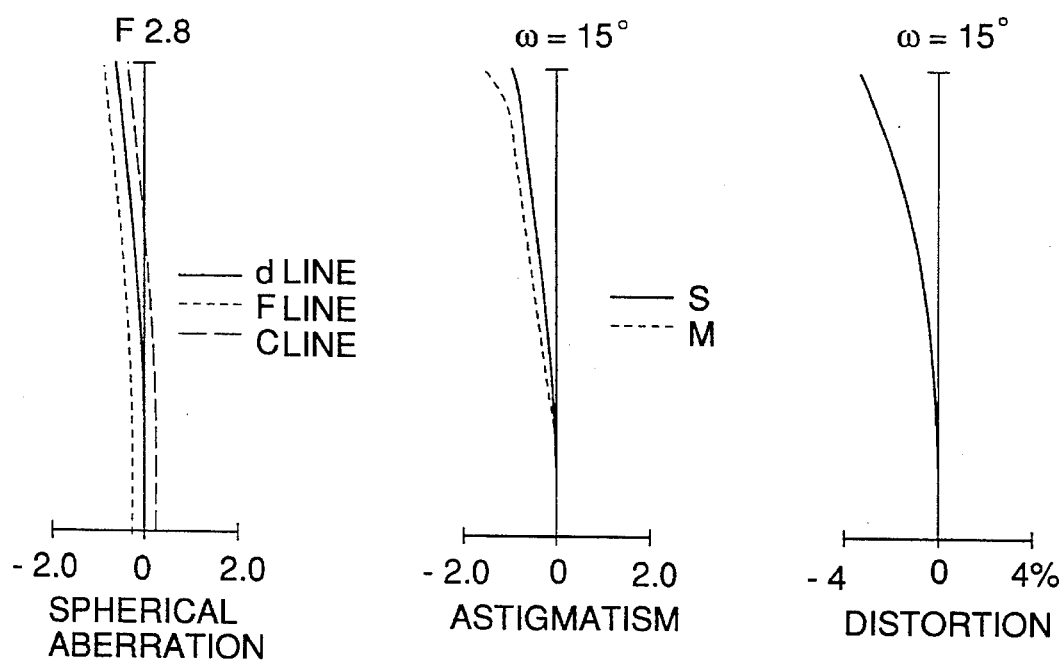
FIG. 19 is an aberration diagram of "intermediate" of the zoom lens system of the seventh embodiment of the present invention.
Figure 19:
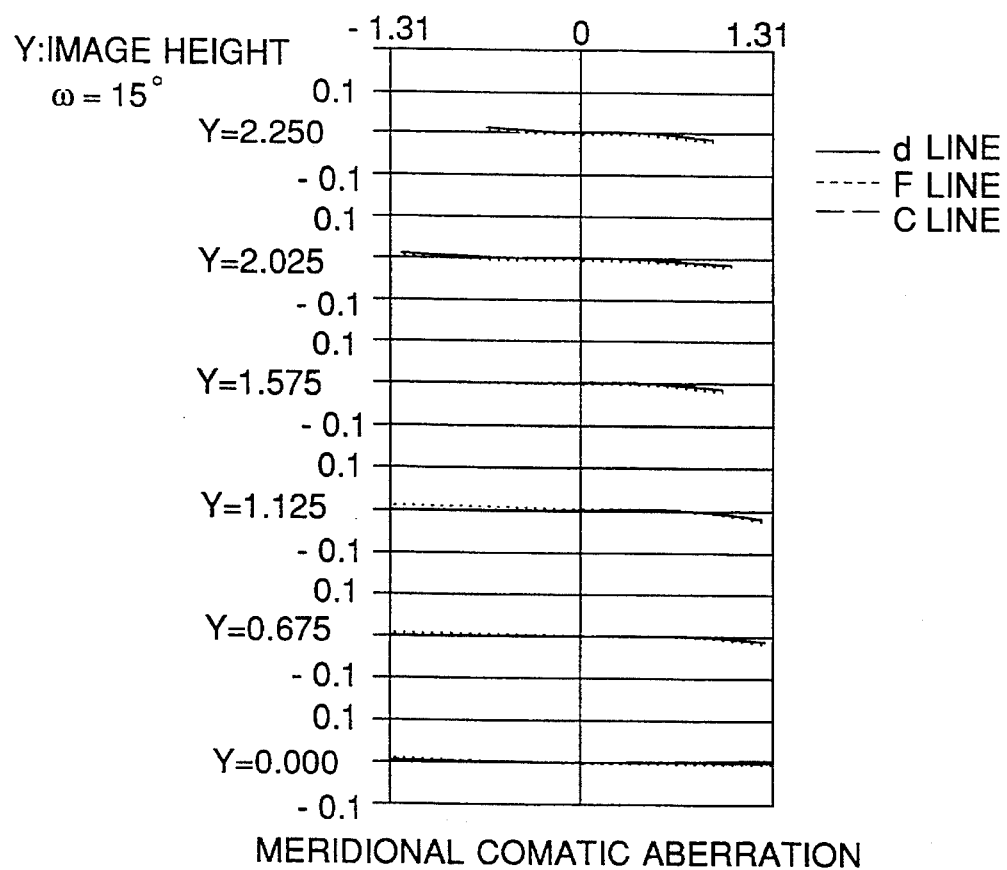
Figure 20:
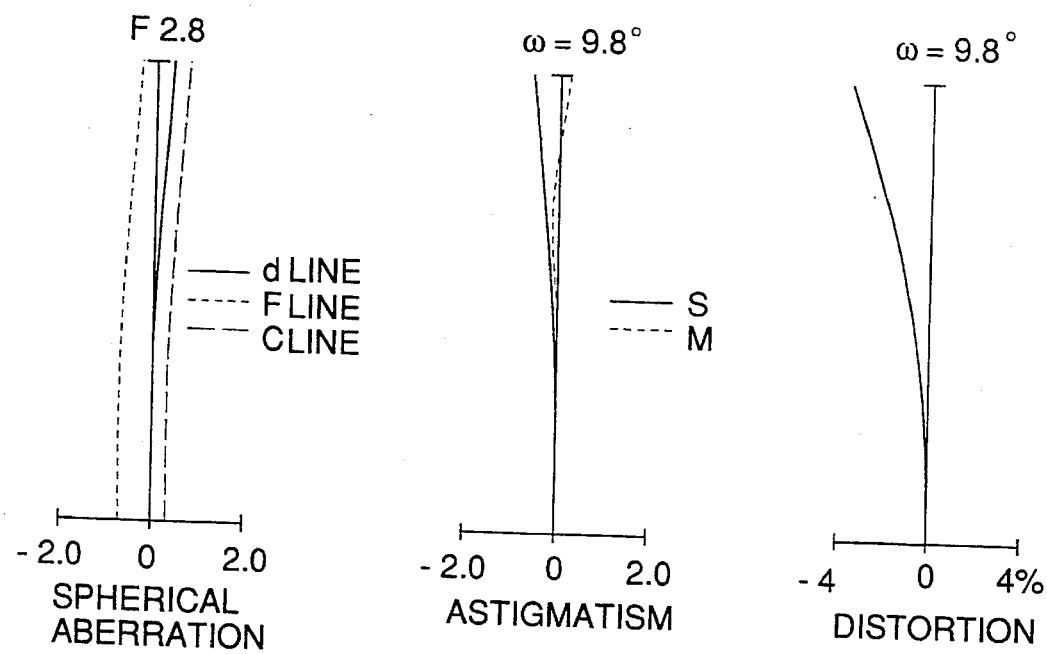
FIG. 20 is an aberration diagram of "telephoto" of the zoom lens system of the seventh embodiment of the present invention.
Figure 20:
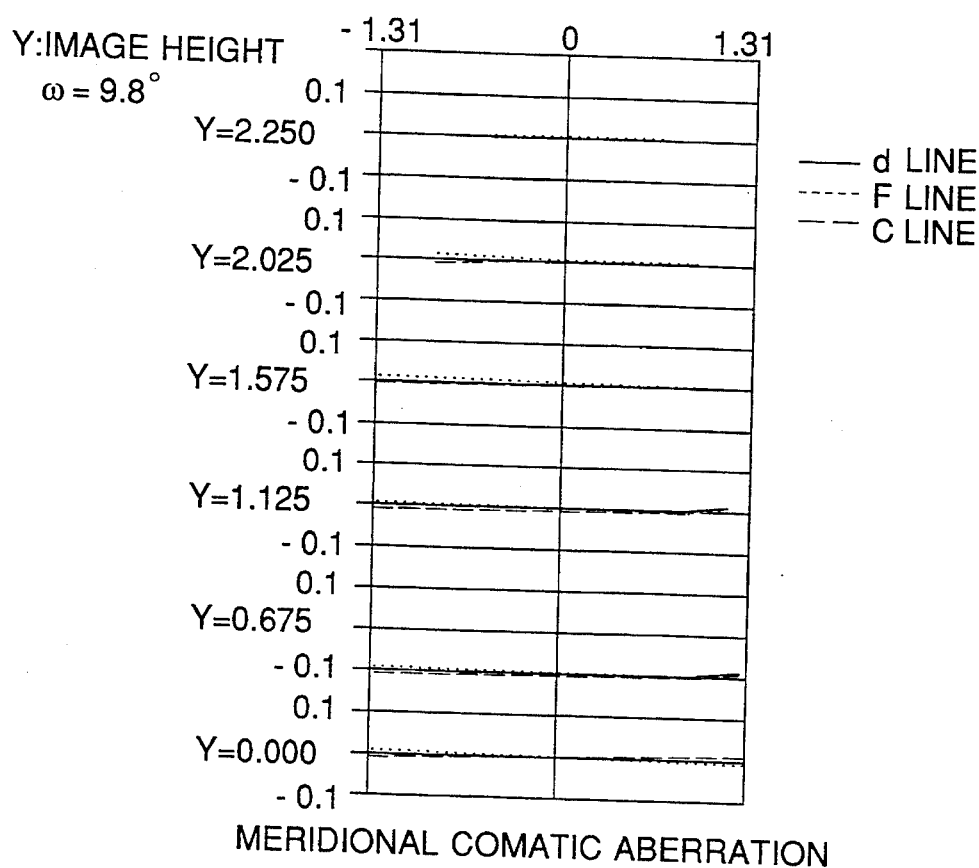

Concerning the second group  vdG = 6.2
  fG/fH = −14.6  vdH/vdG = 7.0
  Consequently  −fG/fH = 2.1 vdH/VdG The lens data of the seventh example is shown in the following table. The sectional views of the lens of this example are shown in FIGS. 17(a) to 17(c), and the aberration diagrams are shown in FIGS. 18 to 20.

| f = 5.2–13.7 | F2.8 | ω = 25°–9.8° | | |
|---|---|---|---|---|
| Surface No. | r | d | nd | vd |
| 1 | 24.751 | 0.70 | 1.84666 | 23.8 |
| 2 | 13.790 | 2.50 | 1.72600 | 53.5 |
| 3 | 422.058 | 0.10 | | |
| 4 | 9.079 | 2.10 | 1.77250 | 49.6 |
| 5 | 18.395 | Variable | | |
| 6 | 39.731 | 0.50 | 1.88300 | 40.8 |
| 7 | 3.893 | 1.20 | | |
| 8 | −83.471 | 0.80 | 1.77250 | 49.6 |
| 9 | −184.467 | 0.50 | | |
| 10 | ∞ | 1.20 | Radial GRIN rod lens 1 | |
| 11 | ∞ | Variable | | |
| 12 | 88.129 | 1.50 | 1.69680 | 55.5 |
| 13 | −8.370 | Variable | | |
| 14 | ∞ | 1.00 | Radial GRIN rod lens 2 | |
| 15 | ∞ | 0.25 | | |
| 16 | 10.304 | 2.00 | 1.72916 | 54.7 |
| 17 | −24.846 | Variable | | |
| 18 | ∞ | 3.68 | 1.51633 | 64.1 |
| 19 | ∞ | 0.42 | | |
| 20 | ∞ | 0.80 | 1.51633 | 64.1 |
| 21 | ∞ | | | |

| | Surface interval | | |
|---|---|---|---|
| | Wide angle | Intermediate | Telephoto |
| $d_5$ | 0.5 | 3.2 | 5.0 |
| $d_{11}$ | 6.75 | 4.05 | 2.25 |
| $d_{13}$ | 0.53 | 0.83 | 1.99 |
| $d_{17}$ | 2.47 | 2.17 | 1.01 |

| Refractive index distribution coefficient | | |
|---|---|---|
| Radial GRIN rod lens 1 | | |
| | $n_0 i$ | $n_1 i$ |
| d | 1.56602 | $-0.70336 \times 10^{-2}$ |
| F | 1.57968 | $-0.78592 \times 10^{-2}$ |
| C | 1.56051 | $-0.67216 \times 10^{-2}$ |
| Radial GRIN rod lens 2 | | |
| | $n_0 i$ | $n_1 i$ |
| d | 1.52206 | $+0.70336 \times 10^{-2}$ |
| F | 1.53056 | $+0.78592 \times 10^{-2}$ |
| C | 1.51850 | $+0.67216 \times 10^{-2}$ |

Figure 21:
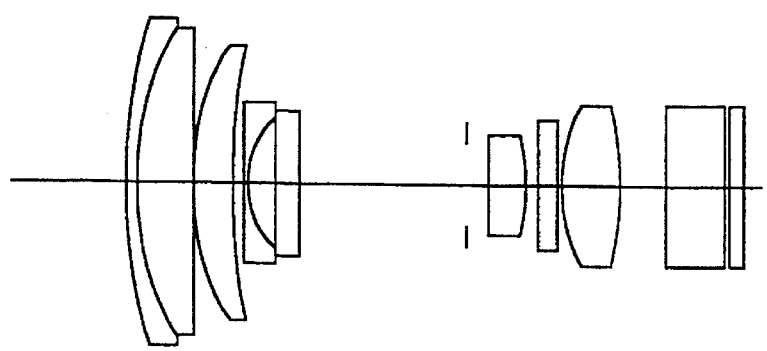
Figure 21:
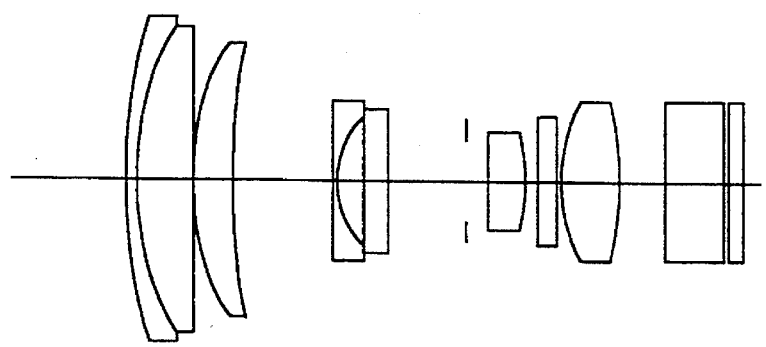
Figure 21:
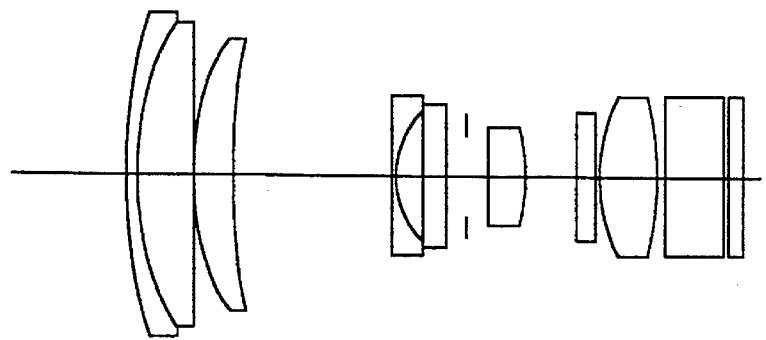
Figure 22:
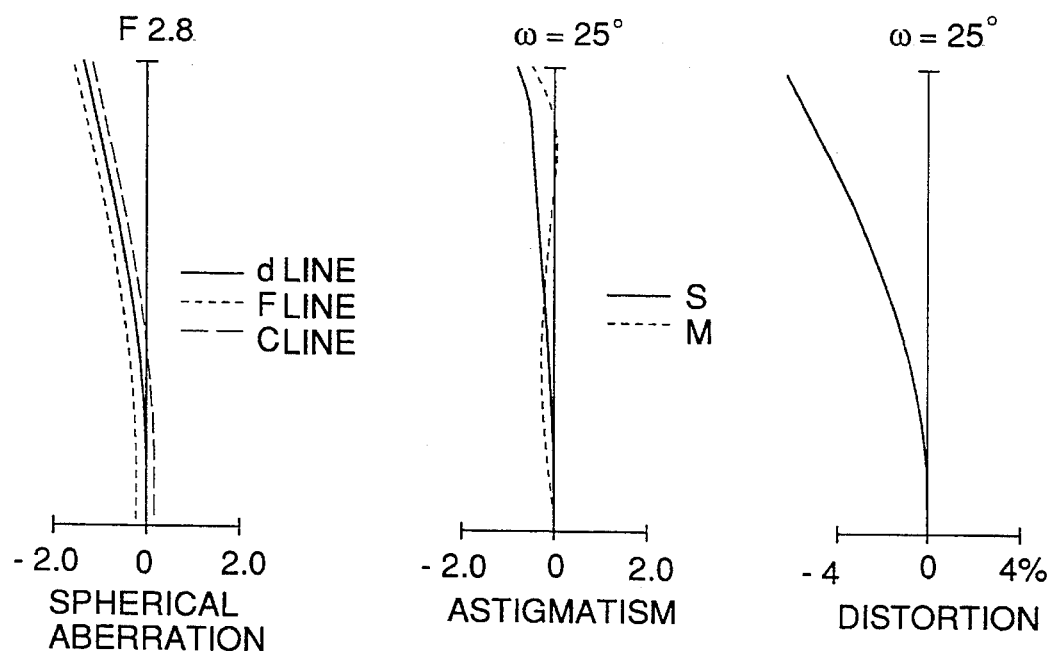
FIG. 22 is an aberration diagram of "wide angle" of the zoom lens system of the eighth embodiment of the present invention.
Figure 22:
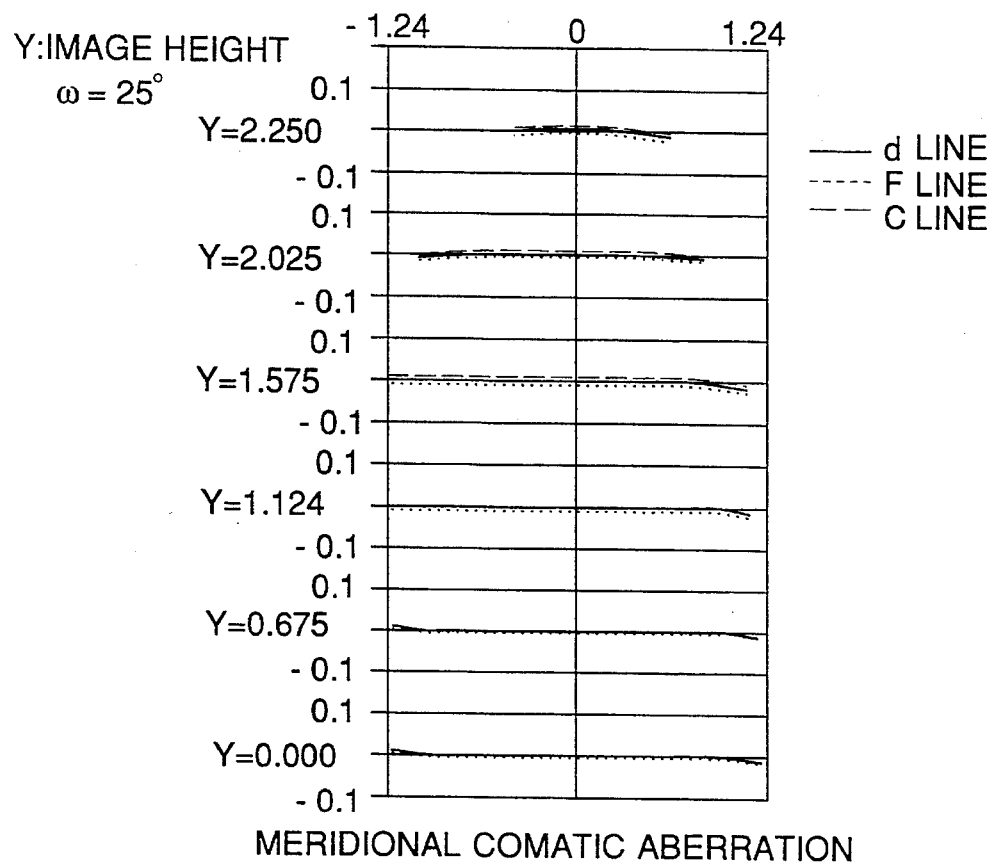
Figure 23:
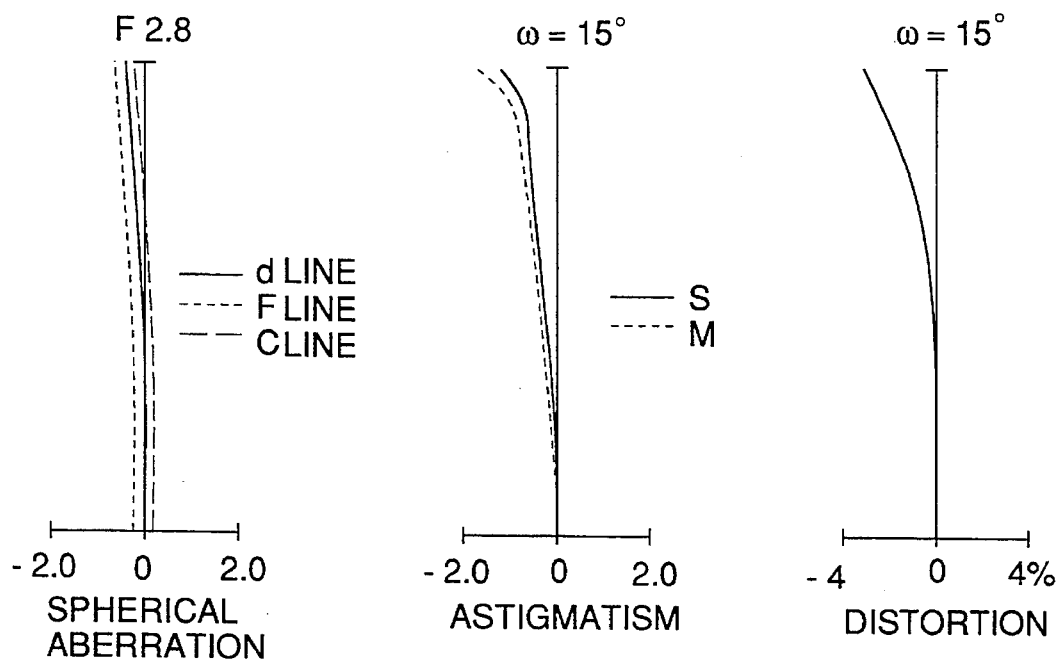
FIG. 23 is an aberration diagram of "intermediate" of the zoom lens system of the eighth embodiment of the present invention.
Figure 23:
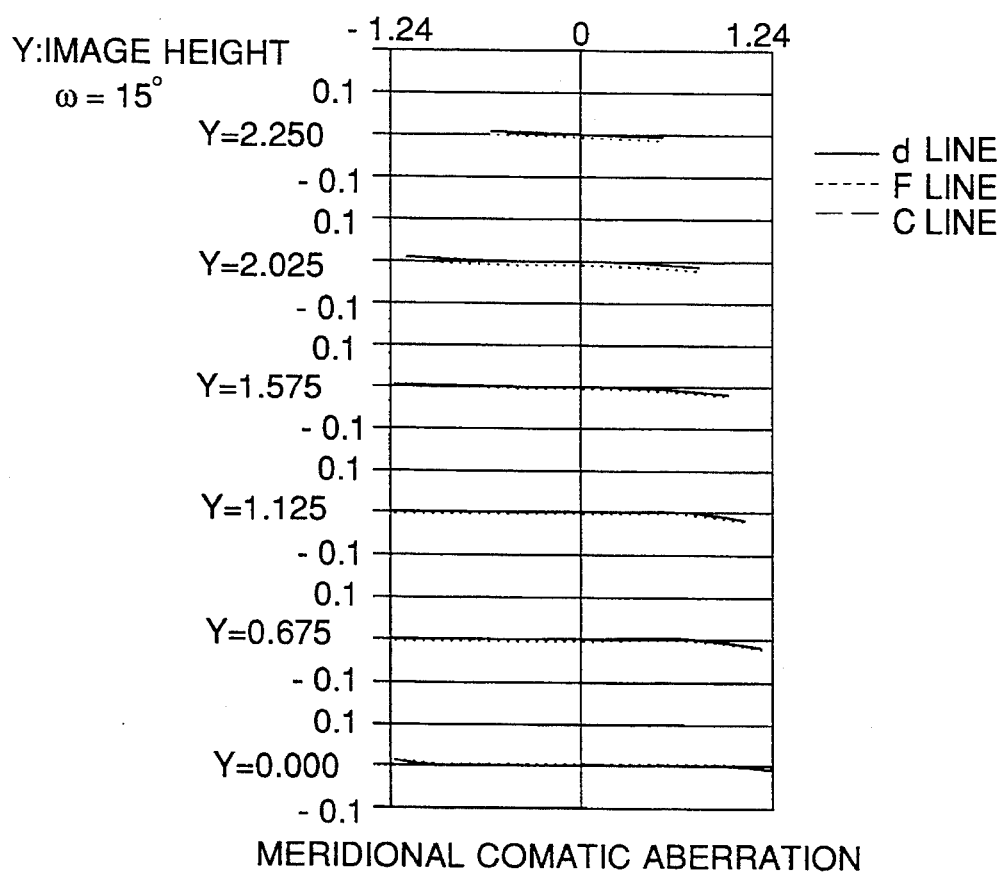
Figure 24:
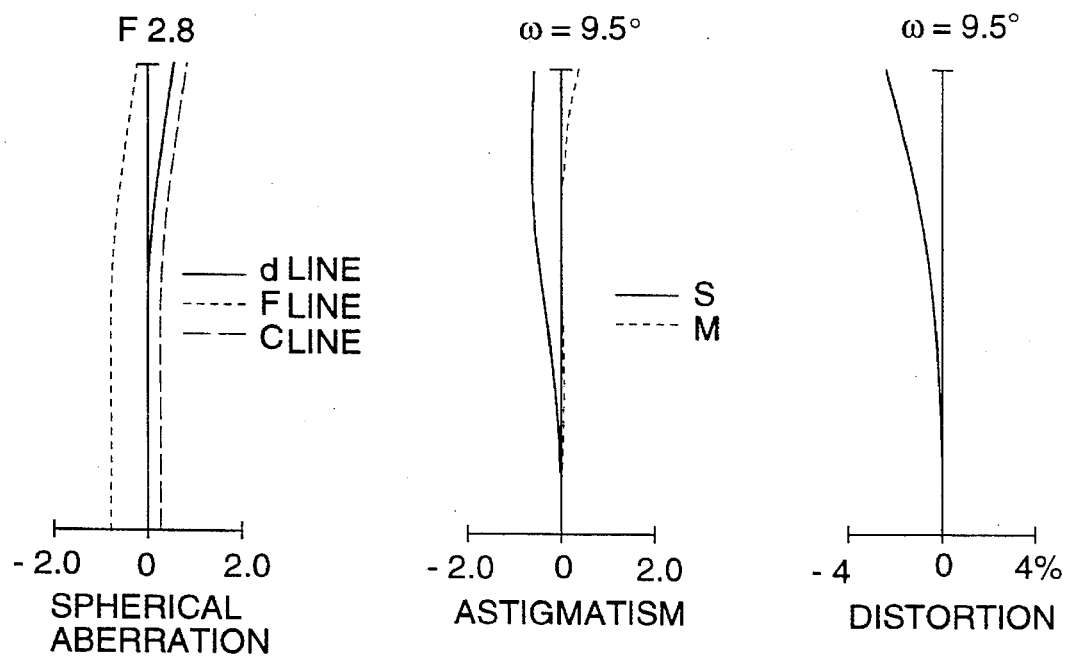
FIG. 24 is an aberration diagram of "telephoto" of the zoom lens system of the eighth embodiment of the present invention.
Figure 24:
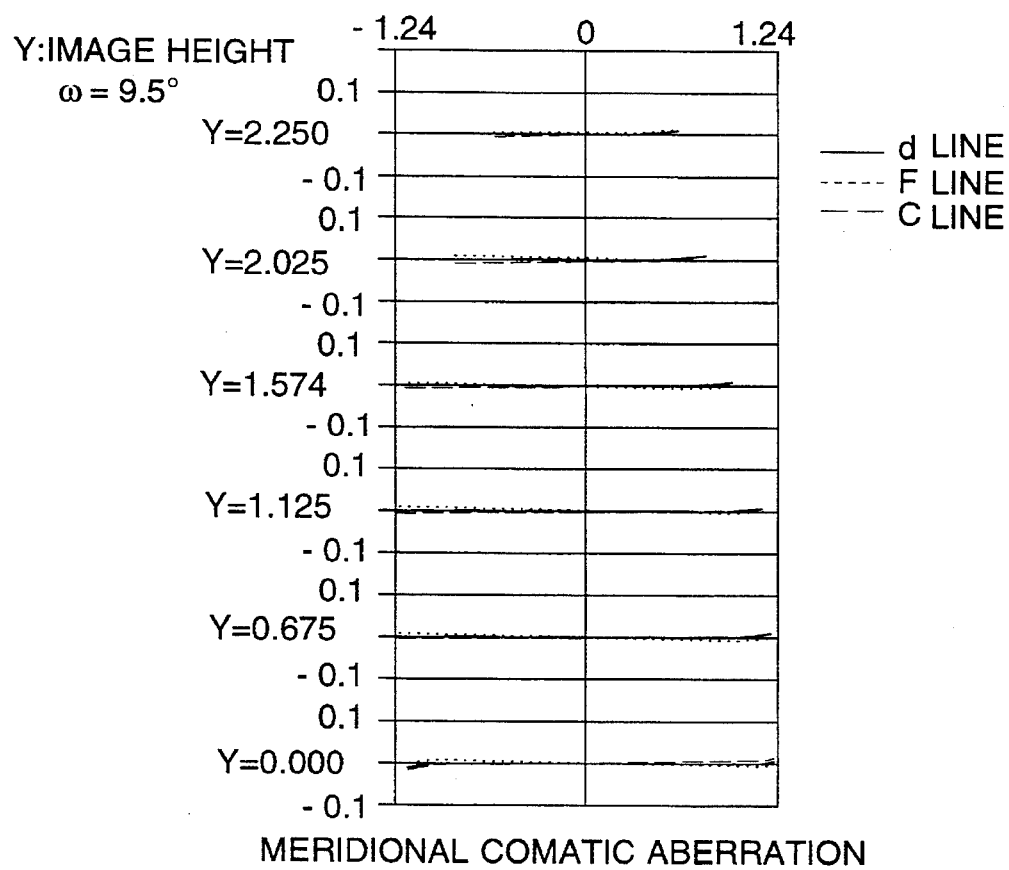

Concerning the second group  vdG = 6.2
  fG/fH = −12.4  vdH/vdG = 6.6
  Consequently  −fG/fH = 1.9 vdH/vdG
Concerning the fourth group  vdG = 6.2
  fG/fH = −6.9  vdH/vdG = 8.8
  Consequently  −fG/fH = 0.78 vdH/vdG The lens data of the eighth example is shown in the following table. The sectional views of the lens of this example are shown in FIGS. 21(a) to 21(c), and the aberration diagrams are shown in FIGS. 22 to 24.

| f = 5.3–13.9 | F2.8 | ω = 25°–9.5° | | |
|---|---|---|---|---|
| Surface No. | r | d | nd | vd |
| 1 | 23.964 | 0.70 | 1.84666 | 23.8 |
| 2 | 13.291 | 2.50 | 1.72600 | 53.5 |
| 3 | 500.678 | 0.10 | | |
| 4 | 9.078 | 2.10 | 1.77250 | 49.6 |
| 5 | 17.709 | Variable | | |
| 6 | 41.492 | 0.50 | 1.88300 | 40.8 |
| 7 | 3.879 | 1.20 | | |
| 8 | ∞ | 1.20 | Radial GRIN rod lens 1 | |
| 9 | ∞ | Variable | | |
| 10 | 51.405 | 1.50 | 1.69680 | 55.5 |
| 11 | −7.792 | Variable | | |
| 12 | ∞ | 1.20 | Radial GRIN rod lens 2 | |
| 13 | ∞ | 0.25 | | |
| 14 | 10.787 | 2.00 | 1.72916 | 54.7 |
| 15 | −19.667 | Variable | | |
| 16 | ∞ | 3.68 | 1.51633 | 64.1 |
| 17 | ∞ | 0.50 | | |
| 18 | ∞ | 0.80 | 1.51633 | 64.1 |
| 19 | ∞ | | | |

| | Surface interval | | |
|---|---|---|---|
| | Wide angle | Intermediate | Telephoto |
| $d_5$ | 0.5 | 3.2 | 5.0 |
| $d_9$ | 6.75 | 4.05 | 2.25 |
| $d_{11}$ | 0.98 | 1.31 | 2.55 |
| $d_{15}$ | 2.02 | 1.69 | 0.45 |

-continued

| Refractive index distribution coefficient | | |
|---|---|---|
| Radial GRIN rod lens 1 | | |
| | $n_0 i$ | $n_1 i$ |
| d | 1.56602 | $-0.70336 \times 10^{-2}$ |
| F | 1.57968 | $-0.78592 \times 10^{-2}$ |
| C | 1.56051 | $-0.67216 \times 10^{-2}$ |
| Radial GRIN rod lens 2 | | |
| | $n_0 i$ | $n_1 i$ |
| d | 1.52206 | $+0.70336 \times 10^{-2}$ |
| F | 1.53056 | $+0.78592 \times 10^{-2}$ |
| C | 1.51850 | $+0.67216 \times 10^{-2}$ |

Figure 25:
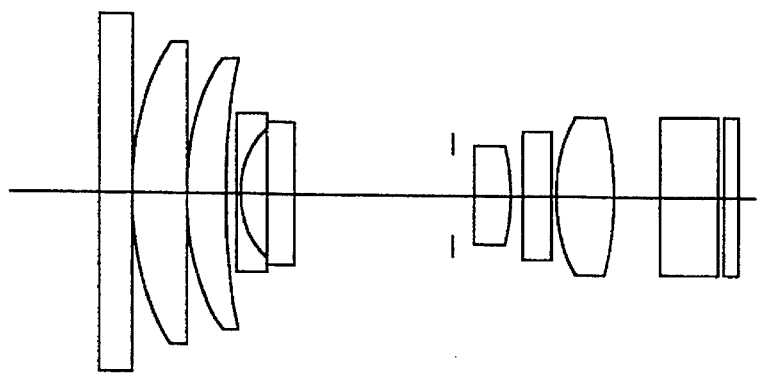
Figure 25:
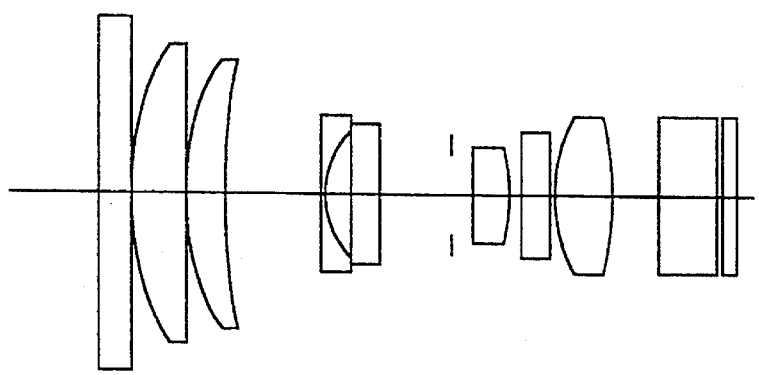
Figure 25:
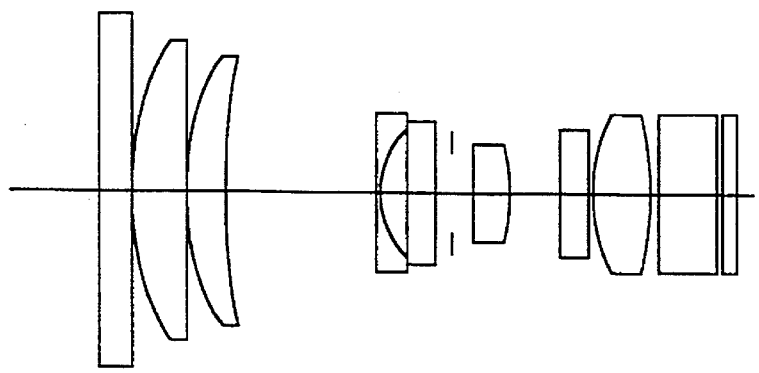
Figure 26:
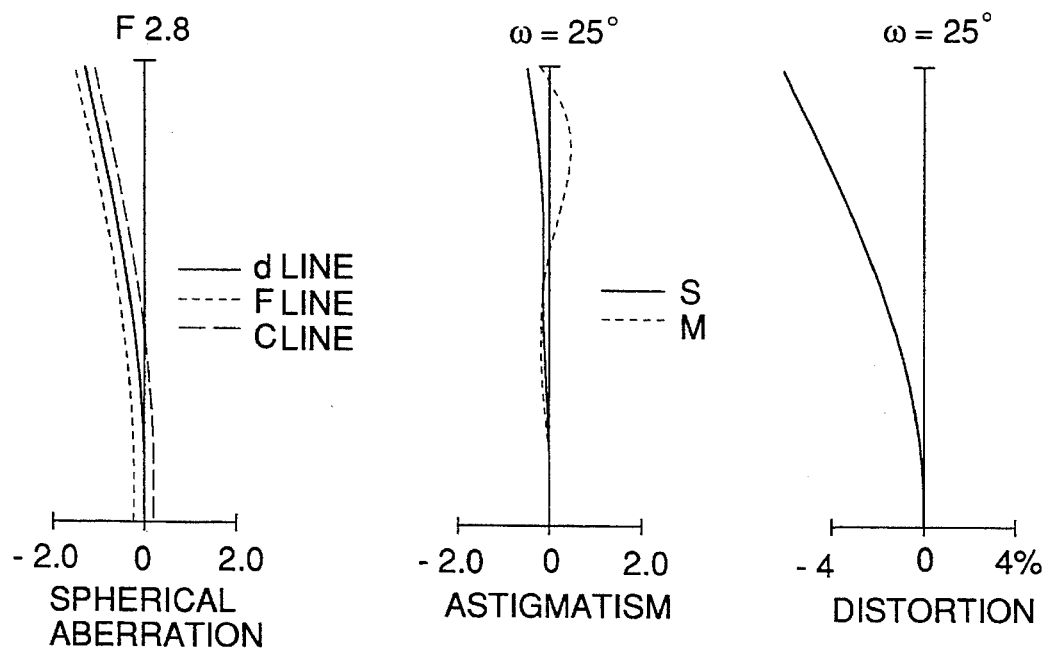
FIG. 26 is an aberration diagram of "wide angle" of the zoom lens system of the ninth embodiment of the present invention.
Figure 26:
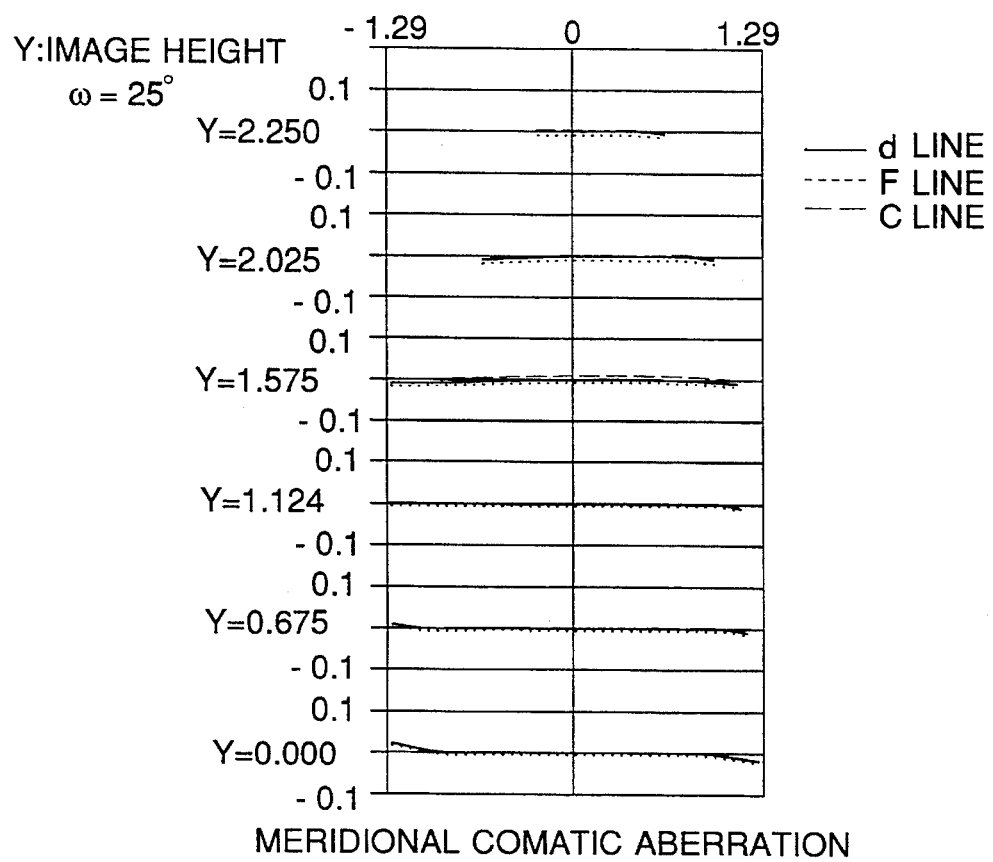
Figure 27:
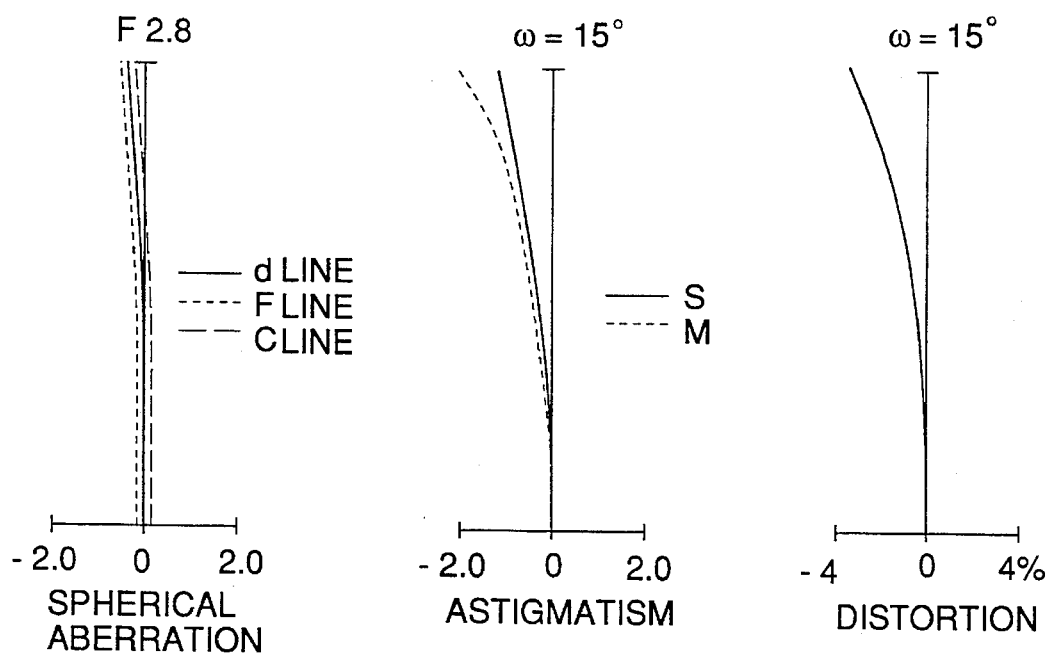
FIG. 27 is an aberration diagram of "intermediate" of the zoom lens system of the ninth embodiment of the present invention.
Figure 27:
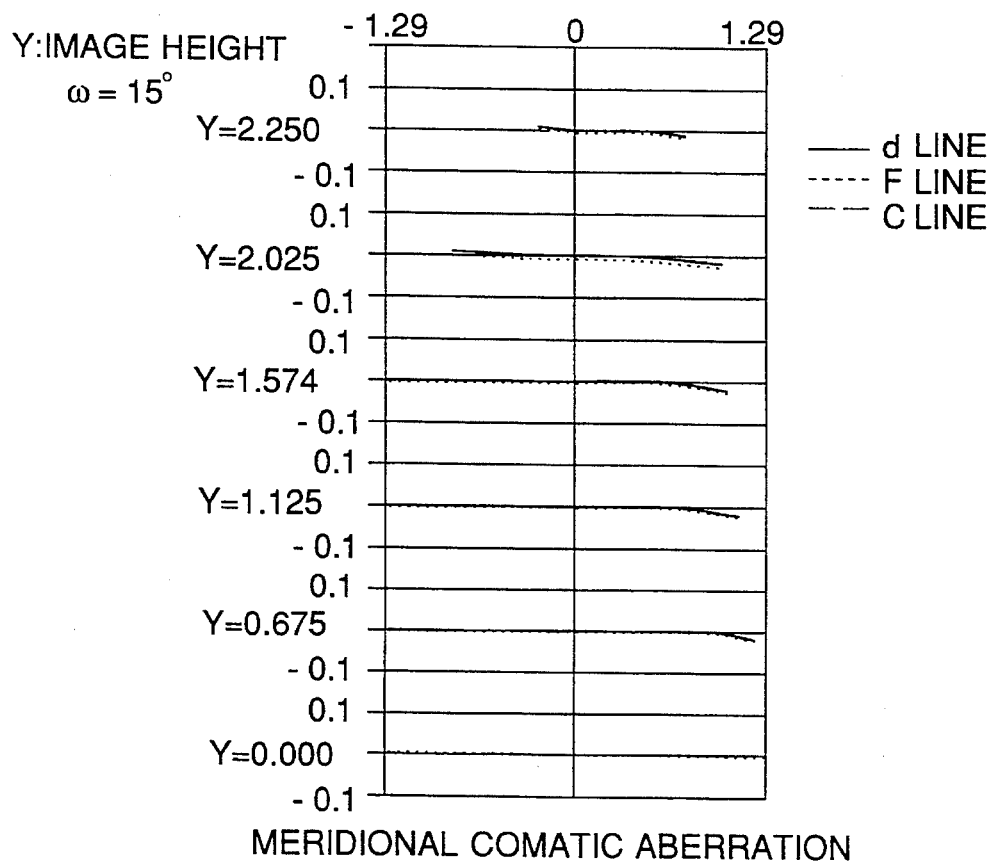
Figure 28:
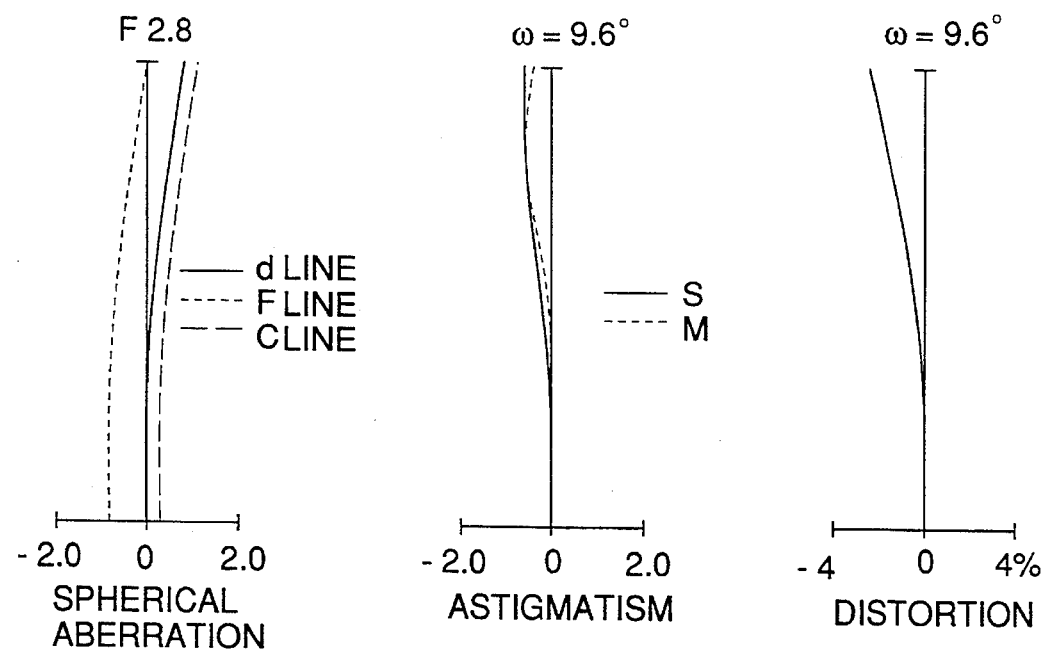
FIG. 28 is an aberration diagram of "telephoto" of the zoom lens system of the ninth embodiment of the present invention.
Figure 28:
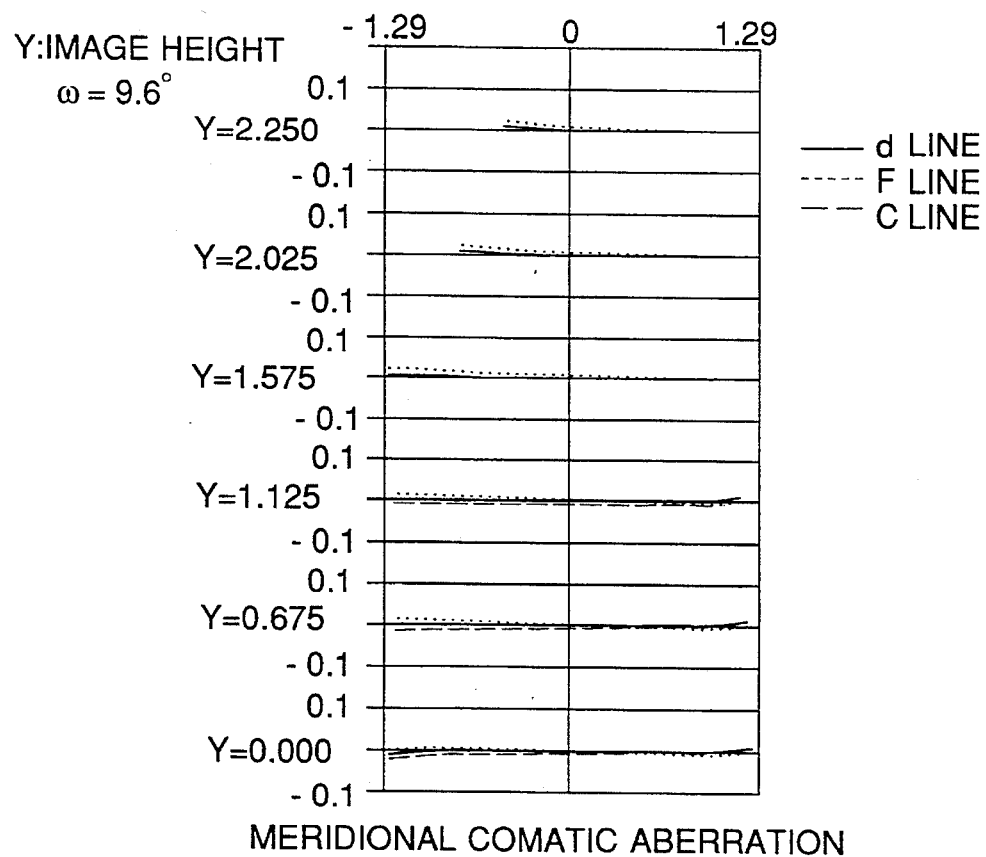

Concerning the second group    vdG = 6.2
   fG/fH = −12.2    vdH/vdG = 6.6
   Consequently    −fG/fH = 1.8 vdH/vdG
Concerning the fourth group    vdG = 6.2
   fG/fH = −6.0    vdH/vdG = 8.8
   Consequently    −fG/fH = 0.68 vdH/vdG The lens data of the ninth example is shown in the following table. The sectional views of the lens of this example are shown in FIGS. 25(a) to 25(c), and the aberration diagrams are shown in FIGS. 26 to 28.

| f = 5.2–13.7 | F2.8 | $\omega$ = 25°–9.6° | | |
|---|---|---|---|---|
| Surface No. | r | d | nd | vd |
| 1 | ∞ | 1.50 | Radial GRIN rod lens 1 | |
| 2 | ∞ | 0.10 | | |
| 3 | 20.958 | 1.70 | 1.77250 | 49.6 |
| 4 | 808.153 | 0.10 | | |
| 5 | 9.251 | 1.80 | 1.77250 | 49.6 |
| 6 | 16.978 | Variable | | |
| 7 | 43.232 | 0.50 | 1.88300 | 40.8 |
| 8 | 3.780 | 1.10 | | |
| 9 | ∞ | 1.50 | Radial GRIN rod lens 2 | |
| 10 | ∞ | Variable | | |
| 11 | 147.543 | 1.50 | 1.77250 | 49.6 |
| 12 | −8.070 | Variable | | |
| 13 | ∞ | 1.50 | Radial GRIN rod lens 3 | |
| 14 | ∞ | 0.25 | | |
| 15 | 12.080 | 2.00 | 1.77250 | 49.6 |
| 16 | −19.706 | Variable | | |
| 17 | ∞ | 3.68 | 1.51633 | 64.1 |
| 18 | ∞ | 0.62 | | |
| 19 | ∞ | 0.80 | 1.51633 | 64.1 |
| 20 | ∞ | | | |

| Surface interval | | | |
|---|---|---|---|
| | Wide angle | Intermediate | Telephoto |
| $d_6$ | 0.5 | 3.2 | 5.0 |
| $d_{10}$ | 6.75 | 4.05 | 2.25 |
| $d_{12}$ | 0.60 | 0.95 | 2.31 |
| $d_{16}$ | 2.10 | 1.75 | 0.39 |

| Refractive index distribution coefficient | | |
|---|---|---|
| Radial GRIN rod lens 1 | | |
| | $n_0 i$ | $n_1 i$ |
| d | 1.52206 | $+0.17584 \times 10^{-2}$ |
| F | 1.53056 | $+0.19648 \times 10^{-2}$ |
| C | 1.51850 | $+0.16804 \times 10^{-2}$ |
| Radial GRIN rod lens 2 | | |
| | $n_0 i$ | $n_1 i$ |
| d | 1.56602 | $-0.70336 \times 10^{-2}$ |
| F | 1.57968 | $-0.78592 \times 10^{-2}$ |
| C | 1.56051 | $-0.67216 \times 10^{-2}$ |
| Radial GRIN rod lens 3 | | |
| | $n_0 i$ | $n_1 i$ |
| d | 1.52206 | $+0.70336 \times 10^{-2}$ |
| F | 1.53056 | $+0.78592 \times 10^{-2}$ |
| C | 1.51850 | $+0.67216 \times 10^{-2}$ |

Figure 29:
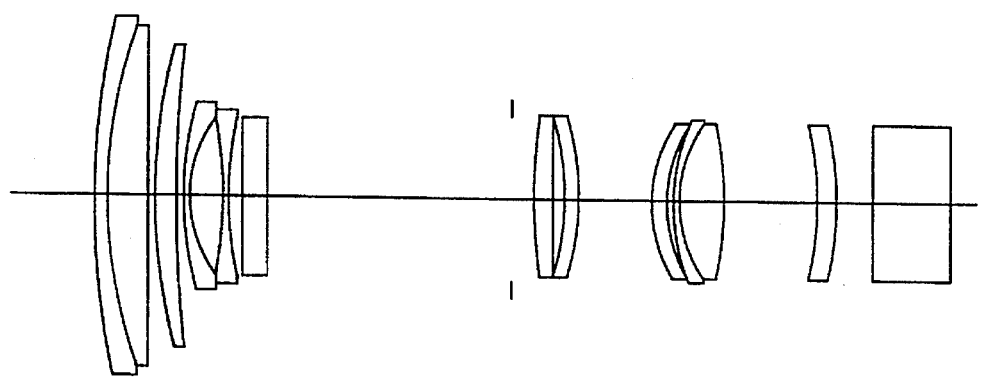
Figure 29:
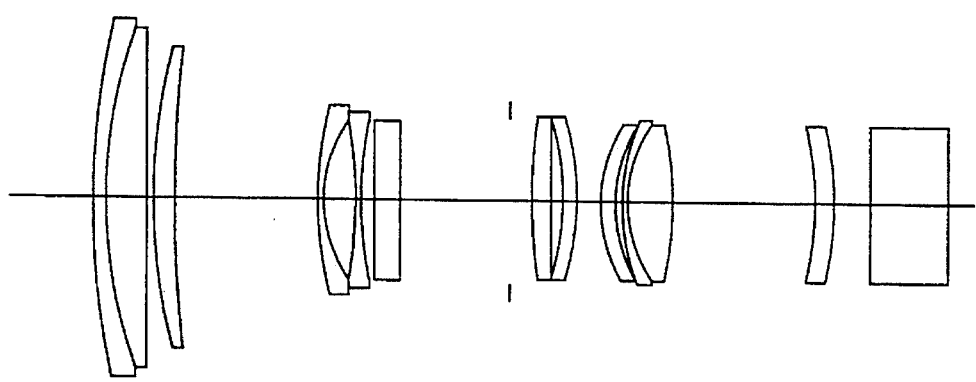
Figure 29:
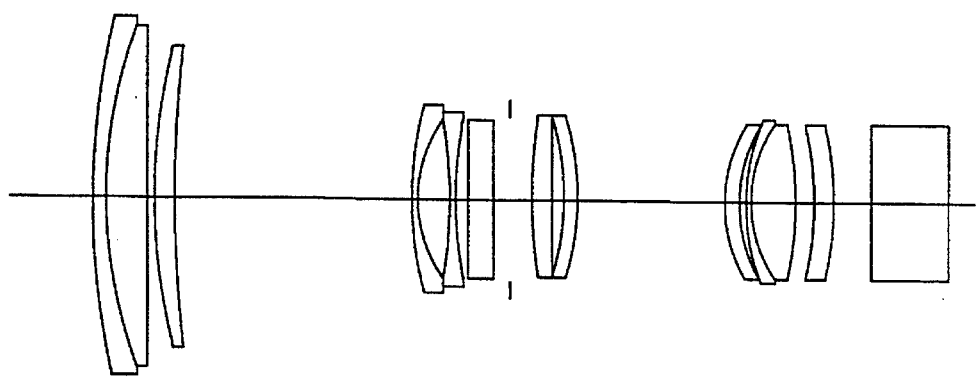
Figure 30:
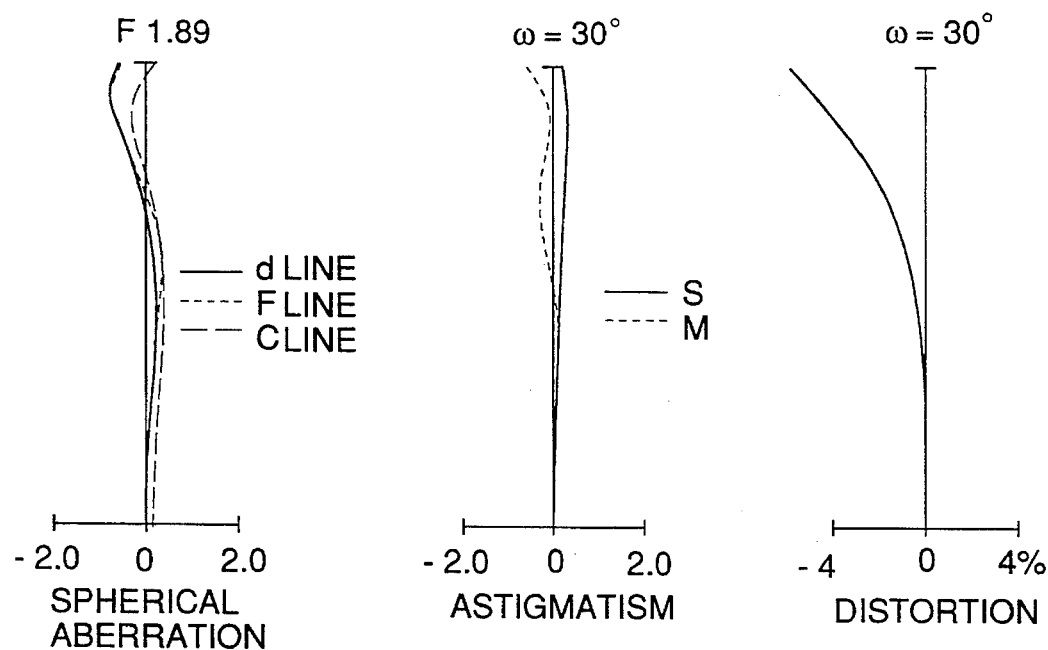
FIG. 30 is an aberration diagram of "wide angle" of the zoom lens system of the tenth embodiment of the present invention.
Figure 30:
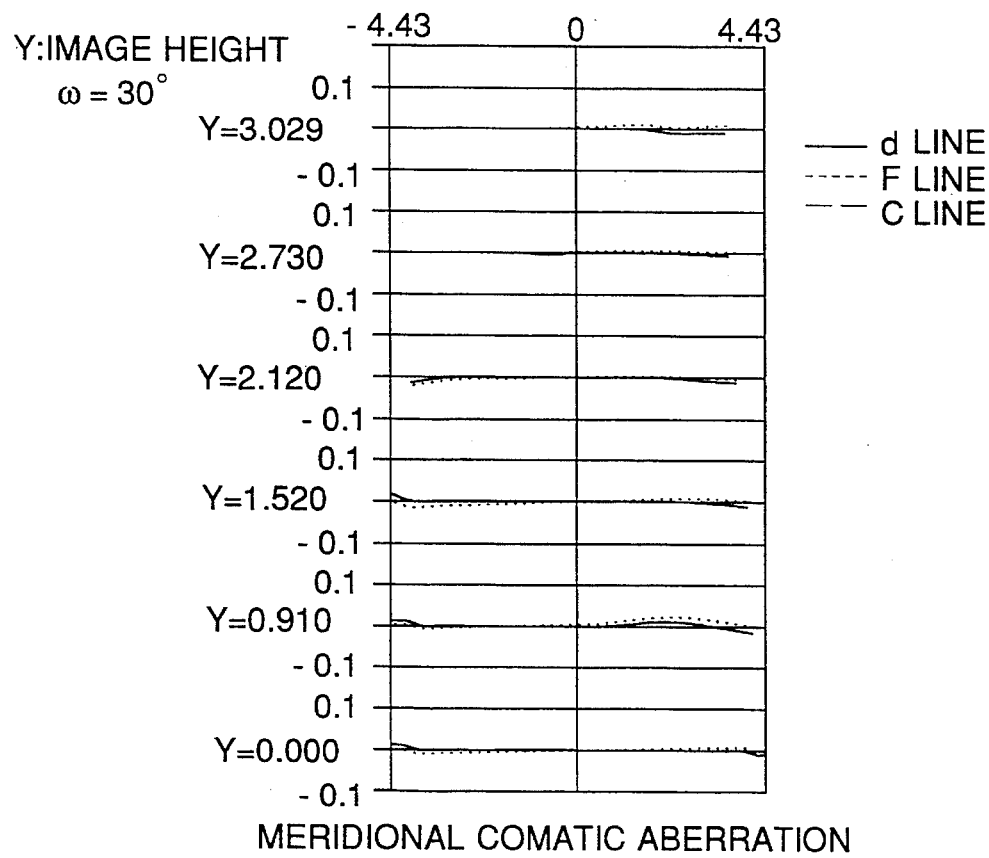
Figure 31:
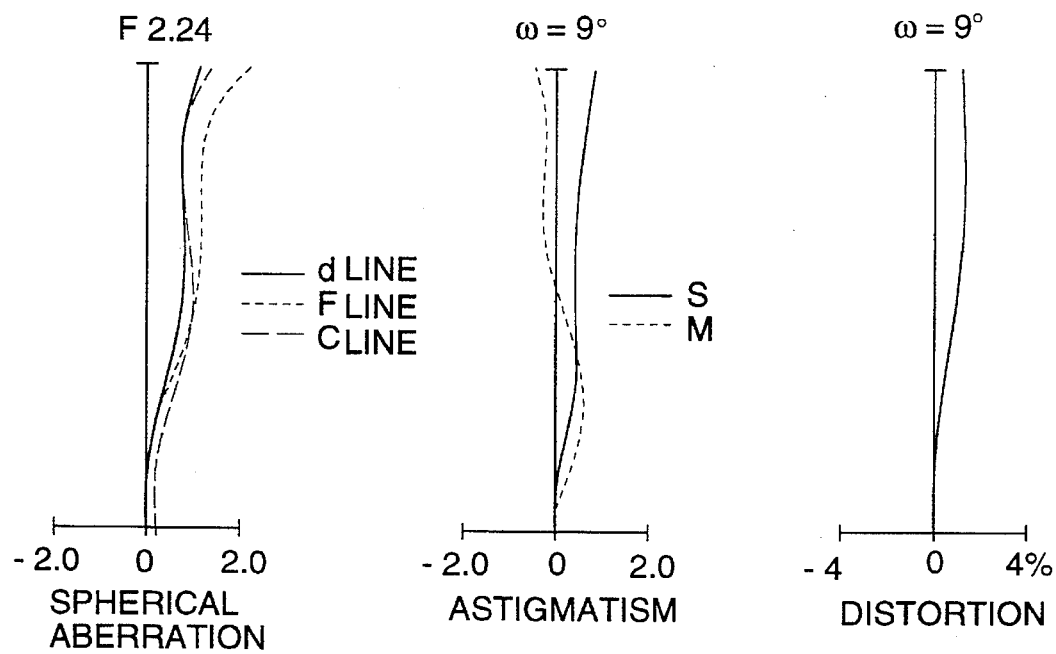
FIG. 31 is an aberration diagram of "intermediate" of the zoom lens system of the tenth embodiment of the present invention.
Figure 31:
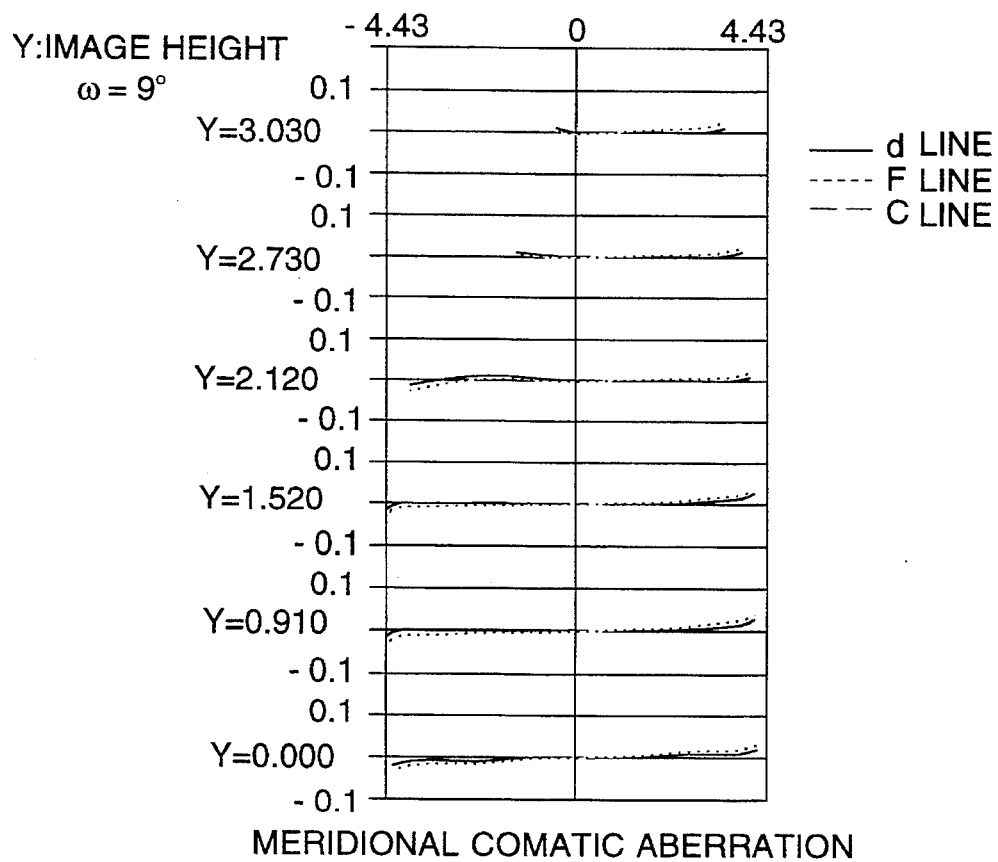
Figure 32:
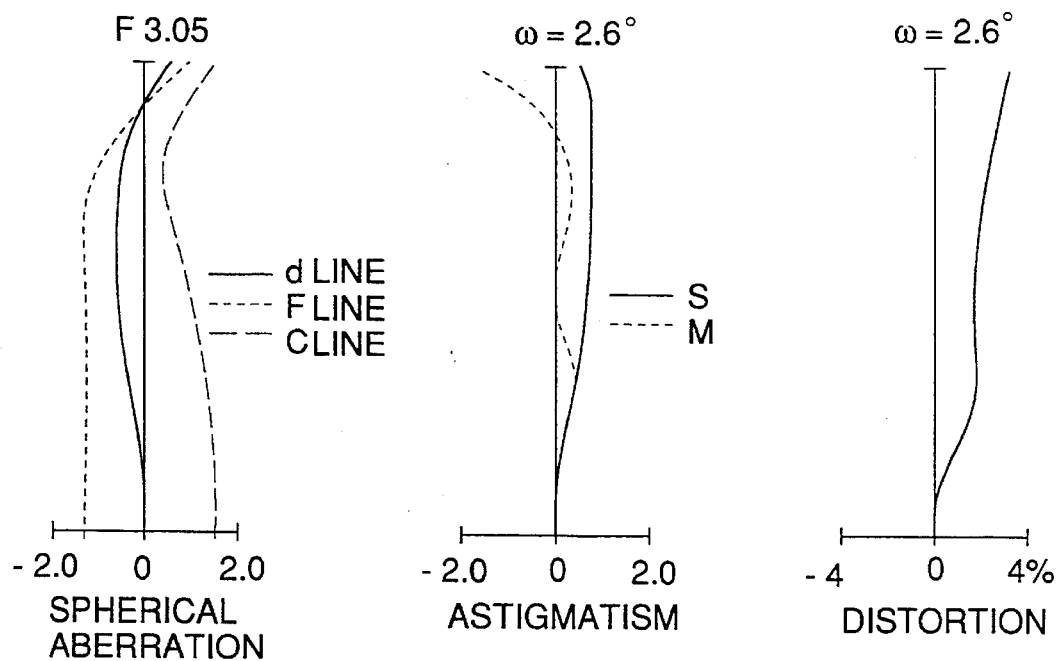
FIG. 32 is an aberration diagram of "telephoto" of the zoom lens system of the tenth embodiment of the present invention.
Figure 32:
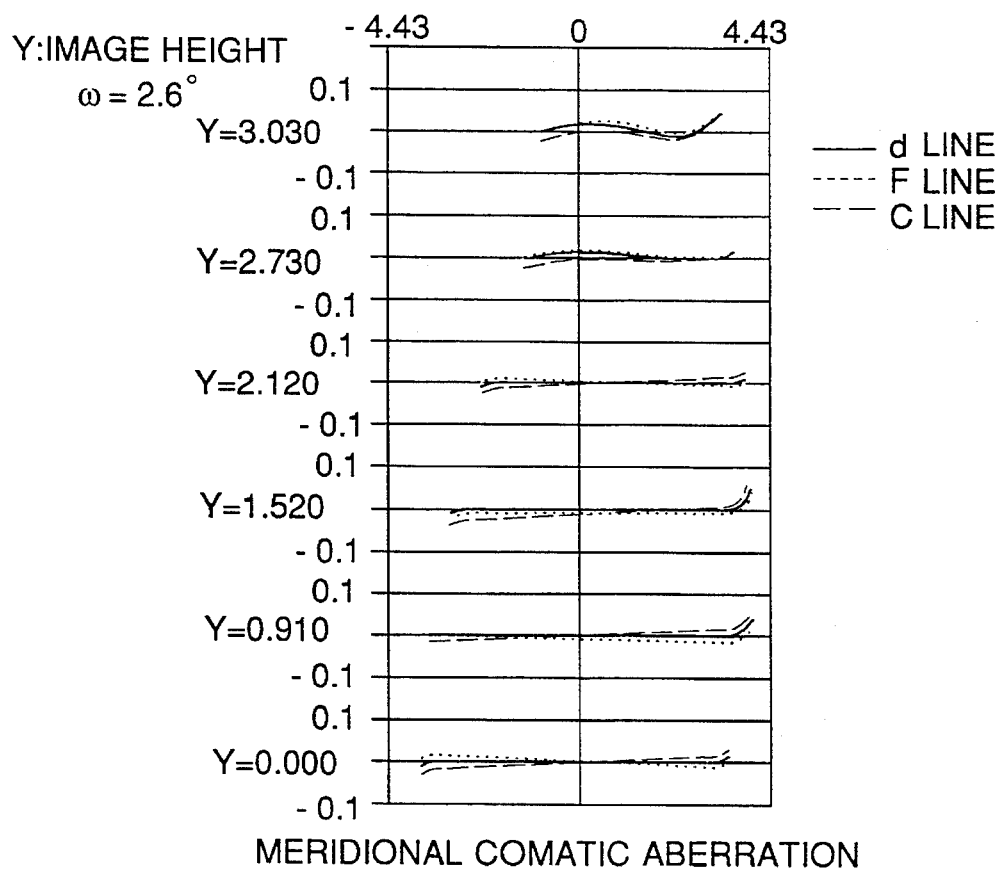

Concerning the first group    vdG = 6.2
   fG/fH = −14.7    vdH/vdG = 8.0
   Consequently    −fG/fH = 1.8 vdH/vdG
Concerning the second group    vdG = 6.2
   fG/fH = −10.1    vdH/vdG = 6.6
   Consequently    −fG/fH = 1.5 vdH/vdG
Concerning the fourth group    vdG = 6.2
   fG/fH = −4.8    vdH/vdG = 8.0
   Consequently    −fG/fH = 0.6 vdH/vdG The lens data of the tenth example is shown in the following table. The sectional views of the lens of this example are shown in FIGS. 29(a) to 29(c), and the aberration diagrams are shown in FIGS. 30 to 32.

| f = 5.7–64.8 | F1.89–3.05 | $\omega$ = 30°–2.6° | | |
|---|---|---|---|---|
| Surface No. | r | d | nd | vd |
| 1 | 31.380 | 0.75 | 1.84666 | 23.8 |
| 2 | 18.278 | 4.50 | 1.69680 | 55.5 |
| 3 | 172.697 | 0.70 | | |
| 4 | 23.590 | 2.32 | 1.69680 | 55.5 |
| 5 | 64.456 | Variable | | |
| 6 | 45.673 | 0.55 | 1.77250 | 49.6 |
| 7 | 8.261 | 2.20 | | |
| 8 | −15.005 | 0.55 | 1.69350 | 53.2 |
| 9 | (Aspherical surface) 18.501 | 1.00 | | |
| 10 | ∞ | 2.50 | Radial GRIN rod lens | |
| 11 | ∞ | Variable | | |
| 12 | 19.052 | 2.15 | 1.60311 | 60.7 |
| 13 | −158.743 | 1.00 | | |
| 14 | −12.945 | 1.30 | 1.49200 | 57.0 |
| 15 | (Aspherical surface) −14.015 | Variable | | |
| 16 | (Aspherical surface) 16.088 | 1.30 | 1.49200 | 57.0 |
| 17 | 16.323 | 0.35 | | |
| 18 | 24.455 | 0.55 | 1.84666 | 23.8 |
| 19 | 8.846 | 3.50 | 1.69680 | 55.5 |
| 20 | −19.959 | Variable | | |
| 21 | −19.335 | 1.40 | 1.49200 | 57.0 |
| 22 | (Aspherical surface) −14.078 | 3.67 | | |
| 23 | ∞ | 4.90 | 1.51633 | 64.1 |
| 24 | ∞ | | | |

Aspherical surface coefficient

Ninth surface    $K = 5.42190 \times 10^{-1}$
   $A_4 = -8.02320 \times 10^{-5}$
   $A_6 = -3.52530 \times 10^{-6}$
   $A_8 = 7.83780 \times 10^{-7}$
   $A_{10} = -2.63160 \times 10^{-8}$
15th surface    $K = 7.07610 \times 10^{-1}$ -continued

|  |  |
|---|---|
|  | $A_4 = 4.34240 \times 10^{-5}$ |
|  | $A_6 = 8.36450 \times 10^{-6}$ |
|  | $A_8 = -3.85290 \times 10^{-7}$ |
|  | $A_{10} = 6.34440 \times 10^{-9}$ |
| 16th surface | $K = -6.94640 \times 10^{-1}$ |
|  | $A_4 = -8.52630 \times 10^{-5}$ |
|  | $A_6 = 8.04260 \times 10^{-6}$ |
|  | $A_8 = -3.36690 \times 10^{-7}$ |
|  | $A_{10} = 4.95380 \times 10^{-9}$ |
| 22nd surface | $K = -5.60460 \times 10^{-1}$ |
|  | $A_4 = -1.77190 \times 10^{-3}$ |
|  | $A_6 = 1.19010 \times 10^{-4}$ |
|  | $A_8 = -4.75240 \times 10^{-6}$ |
|  | $A_{10} = 7.71240 \times 10^{-8}$ |

| | Surface interval | | |
|---|---|---|---|
| | Wide angle | Intermediate | Telephoto |
| $d_5$ | 0.55 | 10.99 | 17.95 |
| $d_{11}$ | 20.35 | 9.91 | 2.95 |
| $d_{15}$ | 4.62 | 1.55 | 10.70 |
| $d_{20}$ | 7.76 | 10.83 | 1.68 |

| Refractive index distribution coefficient Radial GRIN rod lens | | |
|---|---|---|
|  | $n_0 i$ | $n_1 i$ |
| d | 1.56602 | $-0.27475 \times 10^{-2}$ |
| F | 1.57968 | $-0.30700 \times 10^{-2}$ |
| C | 1.56051 | $-0.26256 \times 10^{-2}$ |

| Concerning the second group | $vdG = 6.2$ |
|---|---|
| $fG/fH = -11.7$ | $vdH/vdG = 8.3$ |
| Consequently | $-fG/fH = 1.4 \ vdH/vdG$ |

In the lens system of the present invention, as can be seen in the above examples, when a radial GRIN rod lens and a lens of homogeneous refractive index are combined, ON-axis chromatic aberration and chromatic aberration of magnification which are caused in a lens system of homogeneous refractive index can be very excellently compensated by a relatively thin radial GRIN rod lens.

Especially, in the case where the lens of homogeneous refractive index is a single lens or a doublet, ON-axis chromatic aberration and chromatic aberration of magnification deteriorate the quality of images, so that the lens system of the present invention is very effective. In the case where the lens system of the present invention is applied to a zoom lens, the lens size can be reduced and difficulties caused in the manufacturing process can be avoided.

In the above examples, the present invention is applied only to a simple picture-taking lens and a zoom lens, however, it should be noted that the present invention can be applied to an optical system such as an objective lens of a microscope and an laser optical system to which more severe chromatic aberration compensation is required. Further, the present invention can be applied to various optical systems in which chromatic aberration can not be satisfactorily compensated by the prior art.

Whereas the radial GRIN rod lens is formed into a parallel plane plate, it can be supplied at low cost.

What is claimed is:

1. An optical system comprising:
   (a) a distributed index optical element having a shape of two flat plates in parallel with each other, including a refractive index distribution in a radial direction perpendicular to an optical axis of said optical element in which a refractive index of said optical element is increased and value of color dispersion vd of said optical element is decreased as a location on said optical element is farther away from the optical axis; and
   (b) at least one lens, a refractive index of which is homogeneous,
   wherein when said at least one lens and said optical element is combined, a chromatic aberration generated from said lens is compensated by said optical element, and the following equation is satisfied:

$$vd=(nd-1)/(nF-nc)$$

where nd represents the refractive index of d line of said optical element,
   nF represents the refractive index of F line of said optical element and
   nc represents the refractive index of C line of said optical element.

2. The optical system of claim 1, wherein when the refractive index distribution n of said optical element in the radial direction perpendicular to said optical axis is expressed by the following formula, $$n=n_0 i+n_1 ih^2+n_2 ih^4$$

where h represents the height from said optical axis and i represents wavelength respectively illustrated by lines d, F and C, then the following condition is satisfied, $$vdG=n_1 d/(n_1 F-n_1 c)<20.$$

3. The optical system of claim 2, wherein said optical element comprises a plastic material.

4. A photographic lens System comprising:
   (a) at least one convex lens, a refractive index of which is homogeneous;
   (b) an aperture stop; and
   (c) a first distributed index lens provided on the same side as that of said at least one convex lens with respect to said aperture stop, said distributed index lens having a shape of two flat plates in parallel with each other, including a refractive index distribution in a radial direction perpendicular to an optical axis of said distributed index lens in which a refractive index of said distributed index lens is increased and value of color dispersion vd of said distributed index lens is decreased as a location on said distributed index lens is farther away from the optical axis.

5. The photographic lens system of claim 4, wherein one of said distributed index lens and said at least one convex lens are disposed in order from an object side.

6. The photographic lens system of claim 4, wherein said at least one convex lens comprises at least two convex lenses, one being at least one glass-made lens, the other being at least one plastic-made lens.

7. The photographic lens system of claim 4, wherein at least one face of said at least one convex lens is aspherical.

8. A photographic lens system comprising:
   (a) an aperture stop; and
   (b) distributed index lenses each having a shape of two flat plates in parallel with each other, including a refractive index distribution in a radial direction perpendicular to an optical axis of said distributed index lens, at least one distributed index lens being disposed on each of rear side and a front side of said aperture stop.

9. The photographic lens system of claim 4, wherein said distributed index lens comprises a plastic material, and following conditions are satisfied:
$1.4 < nd(1) < 1.6$ and
$30 < vd(1) < 70$
where nd(1) represents the refractive index of d line on the optical axis and vd(1) represents the color dispersion of d line on the optical axis;
$1.5 < nd(2) < 1.7$ and
$15 < vd(2) < 55$
where nd(2) represents the refractive index of d line at an end of an effective diameter of said distributed index lens and vd(2) represents the color dispersion of d line at the end of the effective diameter of said distributed index lens; and $$vd(1) = \{nd(1)-1\}/\{nF(1)-nc(1)\} \text{ and}$$

$$vd(2) = \{nd(2)-1\}/\{(nF(2)-nc(2)\}$$

where nF(1) and nc(1) represent the refractive index of F line and the refractive index of C line on the optical axis respectively, nF(2) and nc(2) represent the refractive index of F line and the refractive index of C line at the end of the effective diameter of said distributed index lens respectively.

10. The photographic lens system of claim 9, wherein the following inequality is satisfied:

$$0 < \{nd(2)-nd(1)\}/\{vd(1)-vd(2)\} < 0.05.$$

11. A zoom lens including a plurality of lens groups, comprising:
(a) a lens, a refractive index of which is homogeneous; and
(b) a lens element having a shape of two flat plates in parallel with each other, including a refractive index distribution in a radial direction perpendicular to an optical axis of said lens element, said lens element for compensating a chromatic aberration generated from said lens,
wherein at least one of said plurality of lens groups includes at least one of said lens.

12. The zoom lens of claim 11 further comprising:
a second lens group having a negative refractive index,
wherein said second lens group includes at least one of a second lens, a refractive index of which is homogeneous and a second lens element having a shape of two flat plates in parallel with each other and having a positive lens function, including a refractive index distribution in a radial direction perpendicular to the optical axis of said second lens element, said second lens element for compensating a chromatic aberration generated from said second lens.

13. The zoom lens of claim 11 further comprising:
a second lens group having a positive refractive index,
wherein said second lens group includes at least one of a second lens, a refractive index of which is homogeneous and a second lens element having a shape of two flat plates in parallel with each other and having a negative lens function, including a refractive index distribution in a radial direction perpendicular to the optical axis of said second lens element, said second lens element for compensating a chromatic aberration generated from said second lens.

14. The zoom lens of claim 11 further comprising:
a first positive lens group and a second negative lens group provided in order from an object side,
wherein said second negative lens group includes either one or two negative lenses, refractive indexes of which are homogeneous, and a second lens element having a shape of two flat plates in parallel with each other and having a positive lens function, including a refractive index distribution in a radial direction perpendicular to the optical axis of said second lens element.

15. The zoom lens of claim 11 further comprising:
a first positive lens group facing an object,
wherein said first positive lens group includes either one or two positive lenses, refractive indexes of which are homogeneous, and a second lens element having a shape of two flat plates in parallel with each other and having a negative lens function, including a refractive index distribution in a radial direction perpendicular to the optical axis of said second lens element.

16. The zoom lens of claim 11 further comprising:
a first positive lens group;
a second negative lens group;
a third positive lens group; and
a fourth positive lens group,
wherein said first, second, third and fourth lens groups are provided in order from an object side, said second and fourth lens groups are movable during zooming operation, and
wherein said fourth lens group includes at least one positive lens, a refractive index of which is homogeneous, a second lens element having a shape of two flat plates in parallel with each other and having a negative lens function, including a refractive index distribution in a radial direction perpendicular to the optical axis of said second lens element.

17. The zoom lens of claim 11, wherein the following formular are satisfied:

$$0.4 \, v_{dH}/v_{dG} < -f_G/f_H < 2.5 \, v_{dH}/v_{dG}$$

$$\frac{1}{f_H} = \sum_{j=1}^{k} \frac{1}{f_j}$$

$$v_{dH} = \frac{\sum_{j=1}^{k} \frac{1}{f_j}}{\sum_{j=1}^{k} \frac{1}{f_j v_{dj}}}$$

$$v_{dG} = n_1 d/(n_1 F - n_1 c)$$

where fj, j of which is changed from 1 to k, represents a focal length of a j-th lens out of k pieces of lenses each having a homogeneous refractive index, said j-th lens being included in a zoom lens group in which a lens element having a refractive index distribution and a shape of two flat plates in parallel with each other; fG represents a focal length of a lens element having a refractive index distribution in a radial direction perpendicular to an optical axis of said lens element and a shape of two flat plates in parallel with each other; and vdj, j of which is changed from 1 to k, represents value of a color dispersion of the j-th lens out of k pieces of lenses each having a homogeneous refractive index, said j-th lens being included in the zoom lens group in which the lens element having a refractive index distribution and a shape of two flat plates in parallel with each other.

18. The zoom lens of claim 17, wherein the following inequality is satisfied:

$$vdH/vdG > 4.$$

19. The photographic lens system of claim 4 further comprising:

at least one second distributed index lens having a shape of two flat plates in parallel with each other, and displaying a refractive index distribution in a radial direction perpendicular to said optical axis which decreases in a direction moving radially away from said optical axis.

* * * * *